US012219683B2

(12) United States Patent
Ye et al.

(10) Patent No.: US 12,219,683 B2
(45) Date of Patent: Feb. 4, 2025

(54) COOKING APPLIANCE

(71) Applicant: Samsung Electronics Co., Ltd., Suwon-si (KR)

(72) Inventors: Sanggyun Ye, Suwon-si (KR); Kyungjin Kim, Suwon-si (KR); Eonjoong Kim, Suwon-si (KR); Taehun Kim, Suwon-si (KR); Jeawon Lee, Suwon-si (KR); Inki Jeon, Suwon-si (KR); Jiho Jeong, Suwon-si (KR); Seunggee Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 549 days.

(21) Appl. No.: 17/248,234

(22) Filed: Jan. 15, 2021

(65) Prior Publication Data

US 2021/0227648 A1 Jul. 22, 2021

(30) Foreign Application Priority Data

Jan. 17, 2020 (KR) ........................ 10-2020-0006716

(51) Int. Cl.
*H05B 6/64* (2006.01)
*F24C 7/02* (2006.01)
*H05B 6/80* (2006.01)

(52) U.S. Cl.
CPC ............... *H05B 6/647* (2013.01); *F24C 7/02* (2013.01)

(58) Field of Classification Search
CPC ......... F24C 7/02; H05B 6/647; H05B 6/6482; H05B 6/80

(Continued)

(56) References Cited

U.S. PATENT DOCUMENTS 3,302,632 A * 2/1967 Fichtner ............. B65D 81/3453 219/730
6,469,287 B1 10/2002 Kim
(Continued)

FOREIGN PATENT DOCUMENTS

JP 2005205196 A * 8/2005
JP 2006002988 A 1/2006
(Continued)

OTHER PUBLICATIONS

International Search Report of the International Searching Authority in connection with International Application No. PCT/KR2021/000624 issued May 3, 2021, 3 pages.

(Continued)

*Primary Examiner* — Quang T Van

(57) ABSTRACT

A cooking appliance including a cooking chamber configured to cook food therein and openable in a first direction, a shelf provided to be inserted into the cooking chamber in the first direction and having a cooking surface on which food is placed, a magnetron configured to generate high frequency waves to be supplied to the shelf, and a heat generating member configured to generate heat by the high frequency waves generated by the magnetron. Where the cooking surface includes a first area on one side and a second area on another side, the heat generating member includes a first heat generating portion configured to supply heat to the first area and a second heat generating portion disposed to correspond to the second area, and the first heat generating portion supplies more heat to the first area than the second heat generating portion supplies to the second area.

12 Claims, 14 Drawing Sheets

(58) Field of Classification Search
USPC ....... 219/725, 729, 730, 732, 734, 735, 741, 219/744, 759, 749
See application file for complete search history.

(56) References Cited

U.S. PATENT DOCUMENTS

| | | | | |
|---|---|---|---|---|
| 6,541,745 | B2 * | 4/2003 | Kim | H05B 6/6473 219/400 |
| 6,686,568 | B1 * | 2/2004 | Hwang | F24C 7/06 219/393 |
| 7,183,520 | B2 * | 2/2007 | Park | H05B 6/642 219/394 |
| 2009/0206071 | A1 * | 8/2009 | Mori | H05B 6/725 219/749 |
| 2011/0198344 | A1 | 8/2011 | Uchiyama | |
| 2017/0095104 | A1 * | 4/2017 | Kataoka | F24C 11/00 |
| 2017/0251530 | A1 | 8/2017 | Dore et al. | |
| 2019/0133370 | A1 | 5/2019 | Kim | |

FOREIGN PATENT DOCUMENTS

| | | | |
|---|---|---|---|
| JP | 3941051 | B2 | 7/2007 |
| JP | 2007-225186 | A | 9/2007 |
| JP | 2011102661 | A | 5/2011 |
| JP | 5131969 | B2 | 1/2013 |
| JP | 2019-514644 | A | 6/2019 |
| KR | 10-2002-0036599 | A | 5/2002 |
| KR | 10-2004-0017186 | A | 2/2004 |
| KR | 10-0526205 | B1 | 11/2005 |
| KR | 10-2006-0128372 | A | 12/2006 |
| KR | 10-1176130 | B1 | 8/2012 |
| KR | 10-1233212 | B1 | 2/2013 |
| KR | 10-1851219 | B1 | 6/2018 |
| KR | 10-2018-0115981 | A | 10/2018 |

OTHER PUBLICATIONS

Notice of submission of opinion dated Jun. 20, 2024, in connection with Korean Application No. 10-2020-0006716, 19 pages.

* cited by examiner

COOKING APPLIANCE

CROSS-REFERENCE TO RELATED APPLICATION

This application is based on and claims priority under 35 U.S.C. § 119 to Korean Patent Application No. 10-2020-0006716, filed on Jan. 17, 2020 in the Korean Intellectual Property Office, the disclosure of which is incorporated herein by reference.

BACKGROUND

1. Field

The disclosure relates to a cooking appliance, and more specifically, to portioning a cooking space inside a cooking chamber.

2. Description of the Related Art

A cooking appliance is a device for cooking by heating a cooking object, such as food, and providing various cooking related functions, such as heating, defrosting, drying, and sterilization of cooking objects. Examples of such cooking appliances include an oven, such as a gas oven or an electric oven, a microwave heating device (hereinafter, referred to as a microwave), a gas stove, an electric stove, a gas grill, or an electric grill.

In general, an oven refers to a device that cooks food by directly transferring heat to the food through a heating source that generates heat, such as a heater, or by heating the inside of a cooking chamber, and a microwave refers to a device that cooks food by disturbing the molecular arrangement of the food using high frequency waves as a heating source and using frictional heat between molecules generated due to the disturbance of the molecular arrange of the food.

When two or more different cooking objects are cooked through a cooking appliance, the optimum temperatures for cooking the individual cooking objects may be different. In this case, the cooking appliance is capable of cooking food only at the same temperature, and when the different cooking objects are cooked through the cooking appliance at the same time, some cooking object may have poor cooking conditions.

SUMMARY

Therefore, it is an object of the disclosure to provide a cooking appliance in which, when two or more different cooking objects are simultaneously cooked by the cooking appliance, each cooking object may be cooked at a different optimum temperature.

It is another object of the disclosure to provide a cooking appliance capable of easily cooking two or more different cooking objects in a cooking chamber by efficiently partitioning a cooking area.

Additional aspects of the disclosure will be set forth in part in the description which follows and, in part, will be obvious from the description, or may be learned by practice of the disclosure.

According to an aspect of the disclosure, there is provided a cooking appliance including: a cooking chamber configured to cook food therein and openable in a first direction; a shelf provided to be inserted into the cooking chamber in the first direction and having a cooking surface on which food is placed; a magnetron configured to generate high frequency waves to be supplied to the shelf; and a heat generating member caused to generate heat by the high frequency waves generated by the magnetron, wherein the cooking surface includes a first area arranged at one side in a second direction perpendicular to the first direction and a second area arranged at an other side in the second direction, the heat generating member includes a first heat generating portion configured to supply heat to the first area and a second heat generating portion disposed to correspond to the second area, and the first heat generating portion supplies the first area with an amount of heat greater than an amount of heat supplied to the second area by the second heat generating portion.

The cooking surface of the shelf may include a long side extending in the second direction and a short side extending in the first direction.

The heat generating member may include a ferrite material, and the first heat generating portion may include the ferrite material in a content different from a content of the ferrite material included in the second heat generating portion.

The first heat generating portion may include the ferrite material in a content larger than a content of the ferrite material included in the second heat generating portion.

The first heat generating portion may be disposed to correspond to the first area in a third direction perpendicular to the first and second directions, and the second heat generating portion may be disposed to correspond to the second area in the third direction.

The first heat generating portion may be disposed at a side opposite to the second heat generating portion with respect to the cooking surface in the third direction.

The magnetron may be disposed at a lower side of the cooking chamber in the third direction while facing the first heat generating portion and the second generating portion.

The cooking appliance may further include a heater disposed at a side opposite to the magnetron in the cooking chamber, and configured to supply heat to the cooking surface.

The heater may include a first heater disposed to correspond to the first area in a third direction perpendicular to the first and second directions and a second heater disposed to correspond to the second area in the third direction.

The first and second heaters may have a long axis extending in a direction corresponding to the first direction and be spaced apart from each other in the second direction.

The first and second heaters may each be provided to supply a different temperature of heat to a corresponding one of the first and second areas.

The first heater may be provided to supply the first area with an amount of heat that is greater than an amount of heat supplied to the second area by the second heater.

A temperature of heat supplied from the first heater may be provided approximately equal to a temperature of heat emitted from the first heat generating portion, and a temperature of heat supplied from the second heater may be provided approximately equal to a temperature of heat emitted from the second heat generating portion.

The cooking surface may include a third area arranged between the first area and the second area in the second direction, the heat generating member further may include a third heat generating portion provided to supply heat to the third area, and the third heat generating portion may be disposed to correspond to the third area in a third direction perpendicular to the first and second directions.

The third heat generating portion may be provided to supply the third area with heat of a temperature different from a temperature of heat supplied to the first and second areas by the first and second heat generating portions, respectively.

According to another aspect of the disclosure, there is provided a cooking appliance including: a cooking chamber configured to cook food therein and openable in a first direction; a heating source including a heater disposed at one side of the cooking appliance and a magnetron disposed at an other side of the cooking appliance and generating high frequency waves; a shelf provided to be inserted into the cooking chamber in the first direction and having a cooking surface on which food is placed, the cooking surface arranged to face the heater, wherein the shelf includes a heat generating member arranged to face the magnetron and configured to generate heat by high frequency waves generated by the magnetron, the heat generating member includes a first heat generating portion at one side in a second direction perpendicular to the first direction and a second heat generating area arranged at an other side in the second direction, and the first and second heat generating areas are each provided to generate heat at a temperature different.

The heat generating member may include a ferrite material, and the first heat generating portion may include the ferrite material in a content different from a content of the ferrite material included in the second heat generating portion.

The heater may include a first heater disposed to correspond to the first heat generating area in a third direction perpendicular to the first and second directions and a second heater disposed to correspond to the second heat generating area in the third direction.

The first heater may be provided to supply heat to the first area on the cooking surface corresponding to the first heat generating area in the third direction at a temperature different from a temperature of heat supplied to the second area on the cooking surface corresponding to the second heat generating area in the third direction.

According to another aspect of the disclosure, there is provided a cooking appliance including: a cooking chamber configured to cook food therein and openable in a first direction; a shelf provided to be inserted into the cooking chamber in the first direction and having a long side extending in a second direction perpendicular to the first direction; a magnetron configured to generate high frequency waves to be supplied to the shelf; and a heat generating member caused to generate heat by the high frequency waves generated by the magnetron, wherein the heat generating member includes a ferrite material, and includes a first heat generating portion disposed at one side in the second direction and a second heat generating portion disposed at an other side in the second direction, and the first heat generating portion includes the ferrite material in a content different from a content of the ferrite material included in the second heat generating portion.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
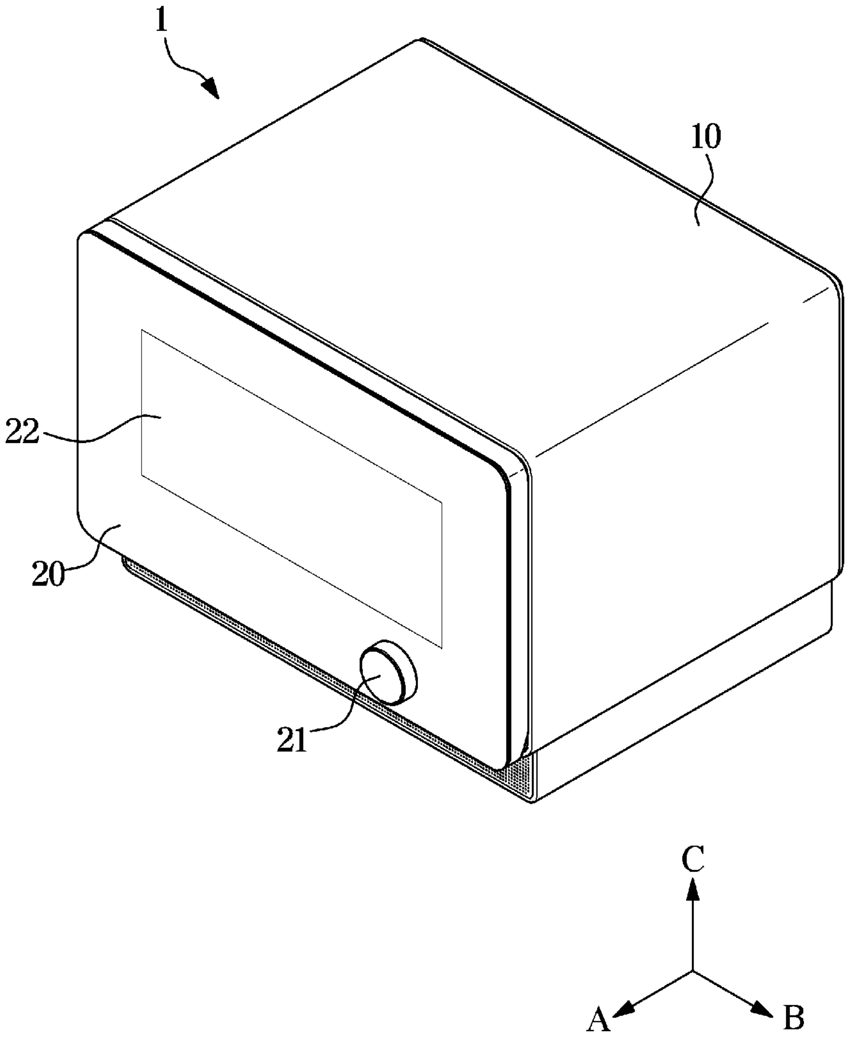
FIG. 1 is a perspective view illustrating a cooking appliance according to an embodiment of the disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments set forth herein and illustrated in the configuration of the disclosure are only the most preferred embodiments and are not representative of the full the technical spirit of the disclosure, so it should be understood that they may be replaced with various equivalents and modifications at the time of the disclosure.

Throughout the drawings, like reference numerals refer to like parts or components.

The terminology used herein is for the purpose of describing particular embodiments only and is not intended to restrict and/or limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, area, layer or section discussed below could be termed a second element, component, area, layer or section without departing from the teachings of the disclosure. Descriptions shall be understood as to include any and all combinations of one or more of the associated listed items when the items are described by using the conjunctive term "~ and/or ~," or the like.

In a cooking appliance according to an embodiment of the disclosure, a microwave is used as an example of the cooking appliance. However, the disclosure is not limited thereto, and the cooking appliance according to the embodiment of the disclosure may be applied to other cooking appliances, such as combination of an oven and a microwave.

Hereinafter, embodiments of the disclosure will be described in detail with reference to the accompanying drawings.

Figure 2:
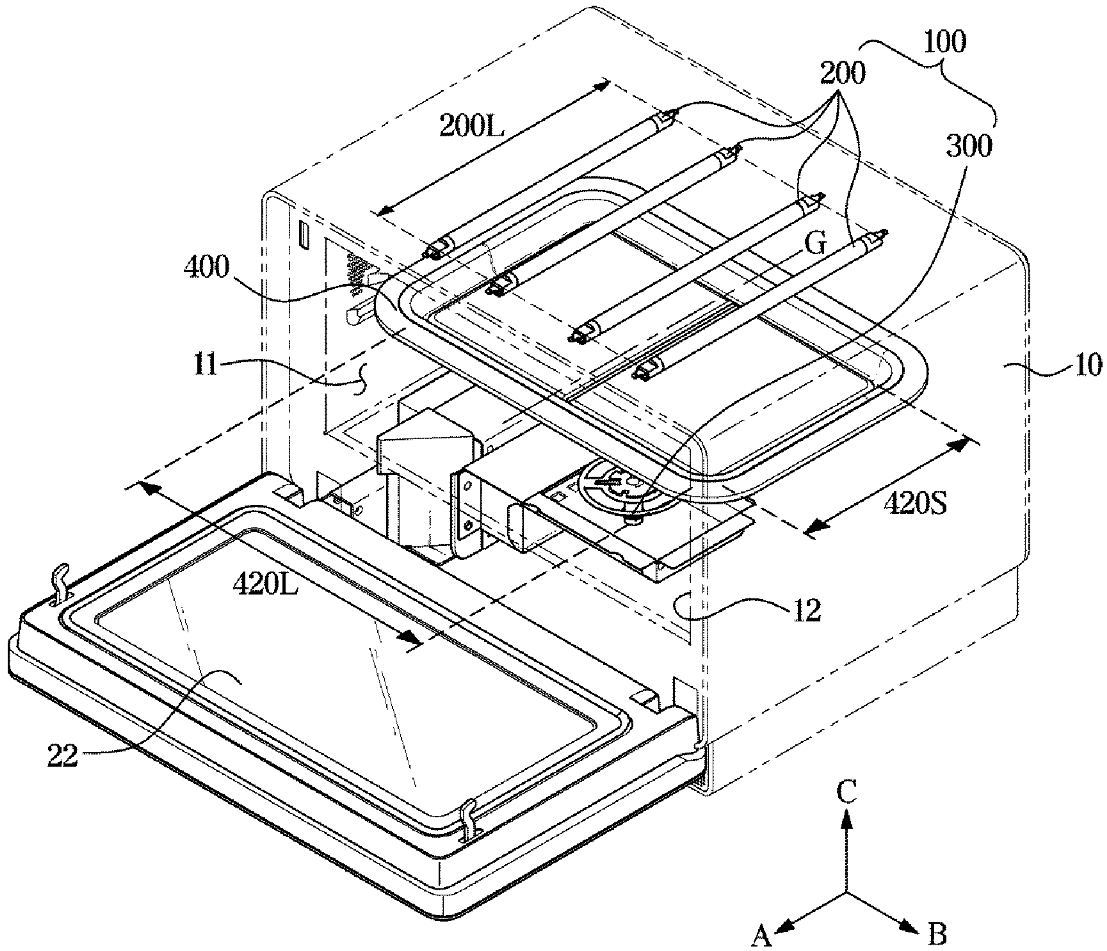
FIG. 2 is a diagram illustrating internal components of the cooking appliance according to the embodiment of the disclosure.
Figure 3:
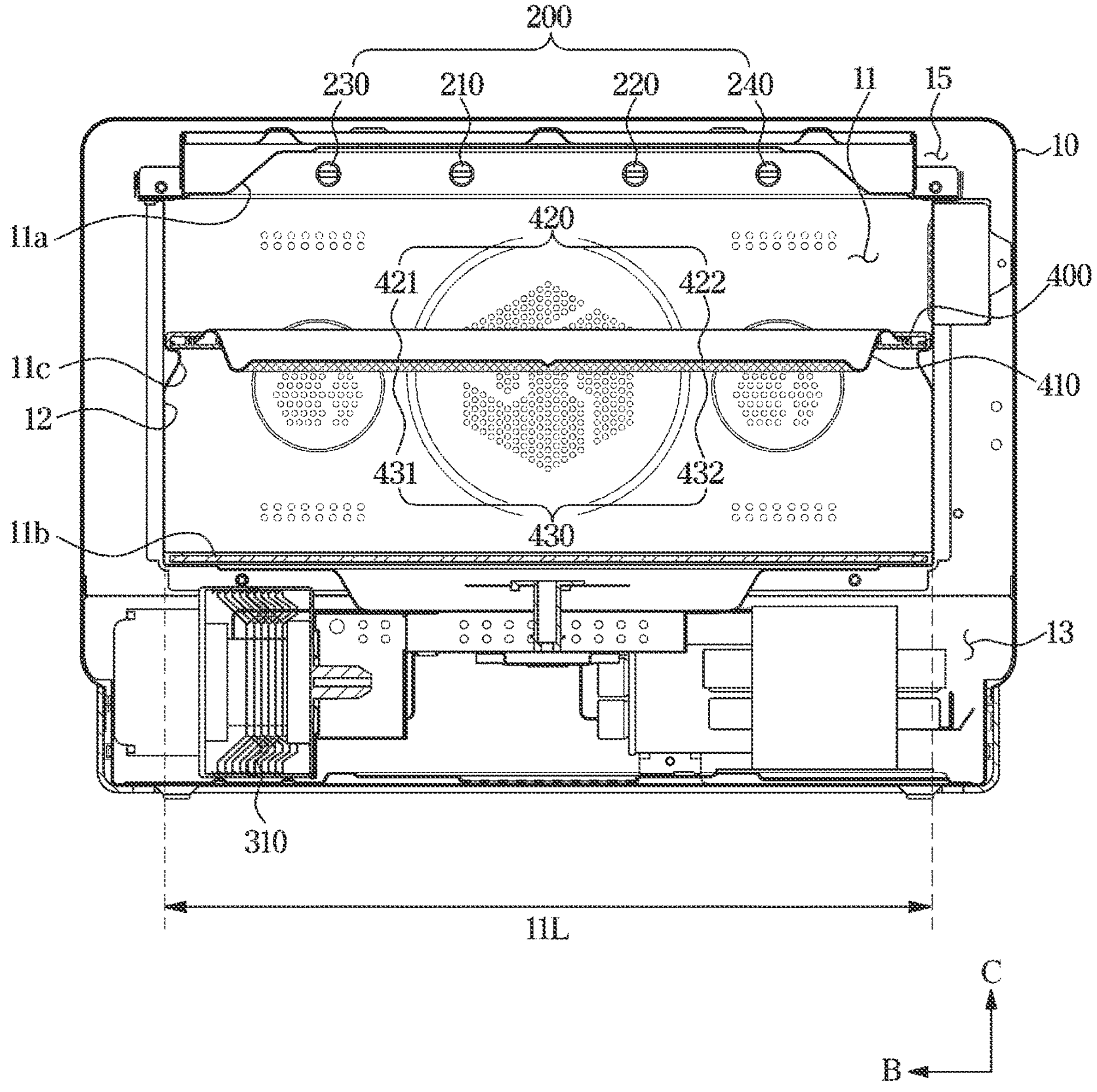
FIG. 3 is a cross-sectional view illustrating the cooking appliance according to the embodiment of the disclosure.
Figure 4:
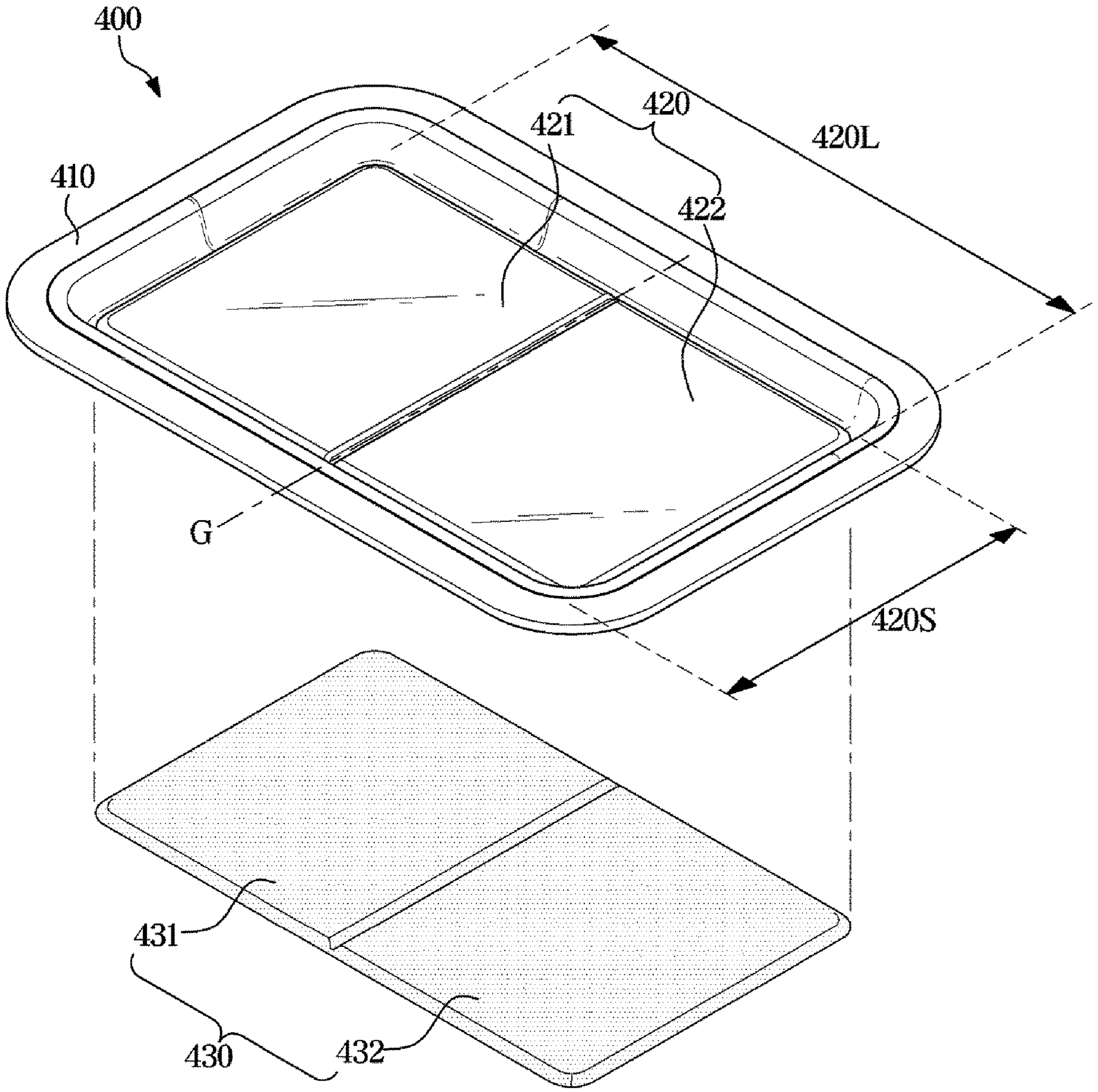
FIG. 4 is an exploded perspective view illustrating a shelf according to the embodiment of the disclosure.
Figure 5:
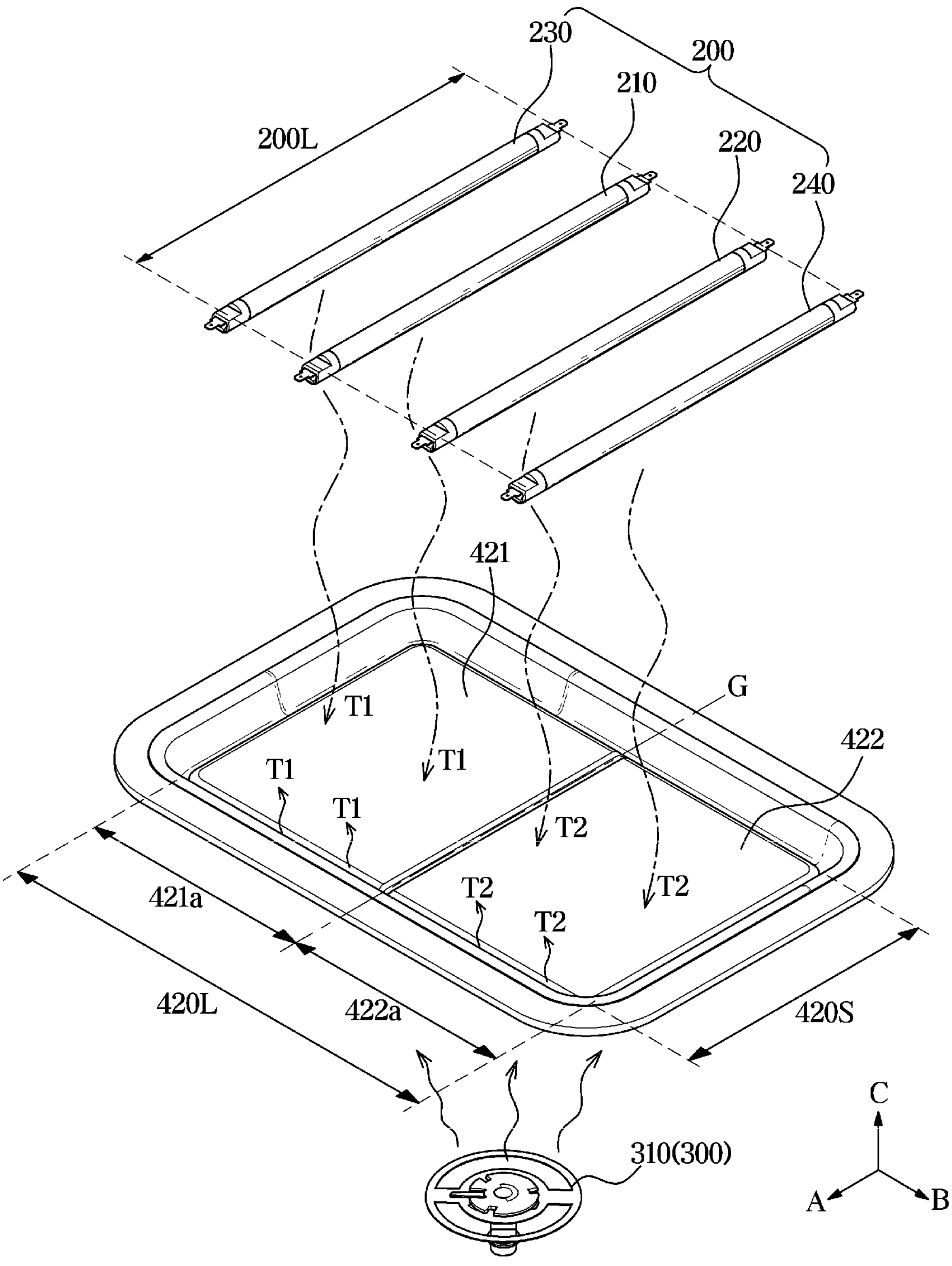
FIG. 5 is a view illustrating some components of the cooking appliance according to the embodiment of the disclosure.

FIG. 1 is a perspective view illustrating a cooking appliance according to an embodiment of the disclosure, FIG. 2 is a diagram illustrating internal components of the cooking appliance according to the embodiment of the disclosure, FIG. 3 is a cross-sectional view illustrating the cooking appliance according to the embodiment of the disclosure, FIG. 4 is an exploded perspective view illustrating a shelf according to the embodiment of the disclosure, and FIG. 5 is a view illustrating some components of the cooking appliance according to the embodiment of the disclosure.

The cooking appliance 1 may include a housing 10 forming the external appearance thereof and a cooking chamber 11 provided inside the housing 10 and in which cooking objects may be placed.

The cooking appliance 1 may include an inner housing 12 disposed inside the housing 10 and forming the cooking chamber 11. Between the inner housing 12 and the housing 10, a predetermined space 15 may be formed.

The housing 10 and the inner housing 12 may be provided to be open in a first direction A, which is a forward direction of the cooking appliance 1.

A user may place a cooking object in the cooking chamber 11 through the opening of the inner housing 12 formed in the first direction A.

The cooking chamber 11 may be provided in a substantially rectangular parallelepiped shape having a long side in a second direction B perpendicular to the first direction A in a left-right direction.

The cooking appliance 1 may include a machine room 13 formed in the housing 10 and disposed below the cooking chamber 11. Various electrical components for driving the cooking appliance 1 may be disposed inside the machine room 13.

The cooking appliance 1 may include a door 20 provided to open and close the openings of the housing 10 and the inner housing 12.

The door 20 may include an inputter 21 for inputting a signal that allows a user to control the cooking appliance 1. The inputter 21 is not limited to the example shown in FIG. 1 and may include a display unit displaying an image or a touch unit provided to input a signal by touching an image.

The door 20 may include a transparent member 22 provided to allow a user to observe the inside of the cooking compartment 11 when the door 20 is closed.

The cooking appliance 1 may include a shelf 400 mounted inside the cooking chamber 11 and provided to allow a user to place cooking object thereon. The shelf 400 may be separably disposed inside the cooking chamber 11.

The cooking chamber 11 may include support portions 11*c* formed on both sides of the cooking chamber 11 so that the shelf 400 is mounted between an upper surface 11*a* and a lower surface 11*b* of the cooking chamber 11.

The support portion 11*c* may be provided in a plurality of units thereof and arranged in a third direction C perpendicular to the first direction A or the second direction B in the upper side and lower side direction so that the shelf 400 is mounted at various heights.

The shelf 400 may include a main body 410 and a cooking surface 420 on which cooking object may be placed. The cooking surface 420 may be provided to face the upper surface 11*a* of the cooking chamber 11 when the shelf 400 is mounted.

The cooking appliance 1 may include a heating source 100 that supplies heat to the inside of the cooking chamber 11 so that the cooking object is cooked by the heat.

The heating source 100 may be provided to supply heat to the cooking object placed on the shelf 400 so that the cooking object is cooked. In addition, the cooking object may be placed on the lower surface 11*b* of the cooking chamber 11 without the shelf 400. Even in this case, the heating source 100 may supply heat to the cooking object located on the lower surface 11*b*.

The heating source 100 may include a first heating source 200 disposed on the upper surface 11*a* of the cooking chamber 11.

The heating source 100 may include a second heating source 300 disposed on the lower surface 11*b* of the cooking chamber 11.

The first heating source 200 may include a plurality of heaters 210, 220, 230, and 240 that generate radiant heat. The plurality of heaters 210, 220, 230, and 240 may radiate heat generated by itself so as to be directly transferred to the cooking object.

The second heating source 300 may include a magnetron 310 generating high frequency waves. The high frequency waves generated by the magnetron 310 may be scanned into the inside of the cooking object, by which the molecular arrangement of moisture contained in the cooking material is repeatedly changed to generate frictional heat between the molecules, so that the inside of the cooking object is cooked.

The magnetron 310 may be disposed in the machine room 13. The second heating source 300 may oscillate a high frequency waves from the machine room 13 toward the lower surface 11*b* of the cooking chamber 11 and the high frequency waves may pass through the lower surface 11*b* to be transmitted to the shelf 400.

The conventional microwave-type cooking appliance is provided to cook a cooking object through a single magnetron. In this case, the high frequency waves are not transferred evenly to all parts of the cooking object depending on the moisture distribution or content of the cooking object, so that the cooking object is not efficiently cooked.

The above described limitation has been eliminated by additionally installing a heater and a heat generating portion provided on a shelf, so that heat is transferred the entire area of the cooking object in the microwave. In particular, in the case of a cooking object that needs to be heated outside the cooking object at a higher temperature, more efficient cooking is achieved through heat from the additional heater and heat transferred from the heat generating portion.

The cooking appliance 1 according to the embodiment of the disclosure may also include the first heating source 200 and the second heating source 300 such that the cooking object may be efficiently cooked.

Since the first heating source 200 is disposed on the upper surface 11*a* of the cooking chamber 11 as described above, radiant heat may be efficiently transferred to an upper side of the cooking object through the plurality of heaters 210, 220,230, and 240.

However, a lower side of the cooking object may not be easily supplied with heat through the plurality of heaters 210,220,230, and 240.

In this case, in order for the lower side of the cooking object to be supplied with additional heat, the user may stop the cooking appliance 1 in operation, withdraw the shelf 400 from the cooking chamber 11, turn the cooking object over, insert the shelf 400 into the cooking chamber 11 again, and restart the cooking appliance 1, which causes inconvenience to the user.

In order to remove such an inconvenience, the cooking appliance 1 according to the embodiment of the disclosure may include a heat generating portion 430 disposed on the shelf 400 such that heat is transferred even to the lower side of the cooking object during cooking.

The heat generating portion 430 may be disposed at a side of the main body 410 of the shelf 3 opposite to the cooking surface 420. The heat generating portion 430 may be provided to face the lower surface 11*b* of the cooking chamber 11 when the shelf 400 is mounted on the cooking chamber 11.

The heat generating portion 430 may generate heat by absorbing high frequency waves generated by the magnetron 310. The heat generating portion 430 may absorb the high frequency waves transmitted from the magnetron 310 facing the heat generating portion 430, and generate heat by the absorbed high frequency waves.

The heat generated by the heat generating portion 430 may be transferred to the cooking surface 420 through the main body 410 of the shelf 400.

That is, as heat generated from the heat generating portion 430 is conducted to the cooking surface 420, the lower side of the cooking object located on the cooking surface 420 may be supplied with the heat.

The heat generating portion 430 may be formed of a ferrite material to absorb high frequency waves. However, the disclosure is not limited thereto, and the heat generating portion 430 may be formed of a mixture of a material capable of generating heat by high frequency waves with ceramic or the like.

Accordingly, heat may be supplied to the upper and lower sides of the cooking object without the user having to additionally turn over the cooking object, so that cooking may be efficiently performed.

In many cases, a plurality of cooking objects having different cooking temperatures are simultaneously placed in a cooking chamber in a cooking appliance and cooked. In this case, the cooking appliance may individually set the plurality of heaters to generate different temperatures of heat.

That is, the amount of heat generated by one of the plurality of heaters may be set to be different from that generated by another heater, so that different temperatures of heat may be transferred to the plurality of cooking objects.

When a plurality of heaters are disposed on the upper surface 11*a* of the cooking chamber 11 and provide different temperatures of heat as in the embodiment of the disclosure, a respective location corresponding to each heater in the third direction C in the cooking chamber 11 may be provided with heat at a temperature of heat corresponding to heat generated by the corresponding heater.

In detail, the cooking surface 420 of the shelf 400 may be partitioned into areas formed to be supplied with different temperatures.

The cooking surface 32 may be provided with a plurality of areas at positions corresponding to respective heaters in the third direction C. Each area may be provided to be directly supplied with different heat generated from each heater.

Accordingly, even when a plurality of cooking objects having different cooking temperatures are placed in the cooking chamber at the same time, the respective cooking objects may be cooked according to different cooking temperatures by the plurality of heaters 210,220,230, and 240 by disposing the respective cooking objects in the plurality of areas of the cooking surface 420 divided based on the cooking temperatures. That is, when each cooking object is placed in a different area, the cooking object may be cooked at a different temperature.

The cooking chamber 11 according to the disclosure is provided in a rectangular parallelepiped shape having the long side 11L extending in the second direction B, and the shelf 400 corresponding to the cooking chamber 11 includes the cooking surface 420 provided in a rectangular shape having a long side 420L in the second direction B and a short side 420S in the first direction A.

When a plurality of areas are divided in the first direction A, which is a short side direction of the cooking surface 420, the plurality of areas in the first direction A are caused to have extended lengths that are short.

Accordingly, when cooking a bulky cooking object, the cooking object is caused to be disposed over a plurality of areas having different temperatures, so that a part of the cooking object may not be cooked at an appropriate temperature.

In addition, the user may observe each cooking object from the outside of the cooking appliance 1 through the transparent member 22, and when one of a plurality of cooking objects is disposed deeply in the first direction A, the user may have a difficulty in observing the cooking object.

In order to alleviate such a limitation, the plurality of heaters 210, 220, 230, and 240 of the cooking appliance 1 according to the embodiment of the disclosure are each provided to have a long axis 200L extending in the first direction A while being spaced apart from each other in the second direction B corresponding to the extending direction of the long side 11L of the cooking chamber 11.

In addition, the shelf 400 may have the cooking surface 420 divided in the second direction B corresponding to the long side 11L of the cooking chamber 11 and may include the heat generating portion 430 configured to supply each divided area of the cooking surface 420 with a different temperature of heat.

Accordingly, the plurality of areas to be supplied with different temperatures of heat may be divided on the cooking surface 420 of the shelf 400 along the second direction B.

As described above, the plurality of heaters 210, 220, 230, and 240 of the cooking appliance 1 are each provided to have a long axis 200L extending in the first direction A while being spaced apart from each other in the second direction B corresponding to the extending direction of the long side 11L of the cooking chamber 11.

The first heater 210 may be disposed on one side in the second direction B and the second heater 220 may be disposed at a side opposite to the first heater 210 in the second direction B.

In detail, the first heater 210 may be disposed on one side and the second heater 220 may be disposed on the opposite side with respect to a center line G of the cooking surface 420 in the second direction B. The third heater 230 may be disposed on the one side adjacent to the first heater 210, and the fourth heater 240 may be disposed on the opposite side adjacent to the second heater 220.

The first heater 210 and the third heater 230 may generate heat of the same temperature. In addition, the second heater 220 and the fourth heater 240 may generate heat of the same temperature.

The first and third heaters 210 and 230 may be provided to generate heat of a temperature different from that of heat generated by the second and fourth heaters 220 and 240. That is, the temperature generated from one side with respect to the center line G and the temperature generated from the opposite side may be provided to be different from each other.

When it is assumed that the temperature of heat generated by the first and third heaters 210 and 230 is set higher than the temperature of heat generated by the second and fourth heaters 220 and 240, the cooking appliance 1 may control the plurality of heaters 210, 220, 230 and 240 such that the temperature of heat generated by the first and third heaters 210 and 230 is higher than the temperature of heat generated by the second and fourth heaters 220 and 240.

Alternatively, the temperature of heat generated by each of the plurality of heaters 210, 220, 230, and 240 may be set to be the same, and during drive of the cooking appliance 1, the plurality of heaters 210, 220, 230, and 240 may be controlled such that the first and third heaters 210 and 230 are continuously driven and the second and fourth heaters 220 and 240 repeat on/off operations. Accordingly, the total temperature of heat generated by the first and third heaters 210 and 230 may be provided higher than the total temperature of heat generated by the second and fourth heaters 220 and 240.

The shelf 400 may include a first area 421 and a second area 422 formed on the cooking surface 420. The first area 421 and the second area 422 may be divided based on the second direction B.

In detail, the first area 421 may be formed on one side with respect to the center line G, and the second area 422 may be formed on the opposite side.

The first area 421 may be disposed at a position corresponding to the first and third heaters 210 and 230 in the third direction C. The second area 422 may be disposed at a position corresponding to the second and fourth heaters 220 and 240 in the third direction C.

As described above, since the temperature of heat generated from the first and third heaters 210 and 230 is different from the temperature of heat generated from the second and fourth heaters 240, the temperature of heat transferred to the first area 421 may be different from the temperature of heat transferred to the second area 422.

The first area 421 may be supplied with heat generated by the first and third heaters 210 and 230 from the upper surface 11*a*, and the second area 422 may be supplied with heat generated by the second and fourth heaters 220 and 240 from the upper surface 11*a*.

Since the heat generated from the first and third heaters 210 and 230 is different from the heat generated from the second and fourth heaters 240, the temperature of heat transferred to the first area 421 is different from the temperature of heat transferred to the second area 422. Accordingly, cooking objects having different cooking temperatures may be respectively placed in the first area 421 and the second area 422 and cooked in the cooking chamber 11 simultaneously.

In addition, since different cooking objects may be laterally positioned with respect to the first direction A, which is a forward direction of the cooking appliance 1, during cooking, the user may easily observe the cooking process of different cooking objects through the transparent member 22 in real time.

The first and second areas 421 and 422 may be supplied with heat conducted from the heat generating portion 430. As described above, the heat generating portion 430 may be heated by the high frequency waves generated by the magnetron 310 disposed on the lower surface 11*b*, and the heat may be conducted to the first and second areas 421 and 422 through the main body 410.

The upper sides of the first and second areas 421 and 422 may be supplied with different temperatures of heat by the plurality of heaters 210, 220, 230, and 240 as described above, while the lower sides of the first and second areas 421 and 422 may be supplied to same temperature of heat by the heat generating portion 430.

As described above, cooking objects having different appropriate cooking temperatures may be cooked in the first and second areas 421 and 422. When heat of the same temperature is supplied from the lower side of the first and second areas 421 and 422, at least one of the two areas 421 and 422 may be supplied with heat of a temperature different from the appropriate cooking temperature, and thus cooking performance may be degraded.

That is, when heat of the same temperature is provided from the lower side of the first and second areas 421 and 422, the user may turn over the cooking object placed in at least one of the first and second areas 421 and 422, otherwise, the cooking object is not supplied with an appropriate temperature and thus the degree of completeness of the cooking object may be deteriorated.

To prevent such a limitation, the heat generating portion 430 may include a first heat generating portion 431 and a second heat generating portion 432 each generating heat of a different temperature to a corresponding one of the first and second areas 421 and 422.

The first heating portion 431 may be disposed at a position corresponding to the first area 421 in the third direction C.

The second heat generating portion 432 may be disposed at a position corresponding to the second area 422 in the third direction C.

The first heat generating portion 431 may generate heat to provide the first area 421 with a predetermined temperature of heat. The second heat generating portion 432 may generate heat to provide the second area 422 with heat of a temperature different from the temperature generated by the first heat generating portion 431.

The first heat generating portion 431 and the second heat generating portion 432 may each be provided to generate heat that reaches a different temperature. Accordingly, different temperatures of heat are transmitted to the first and second areas 421 and 422, and a cooking object placed in each of the areas 421 and 422 may be cooked at a different temperature.

The heat generating portion 430 may be formed of a single heat generating member. Accordingly, the first heat generating portion 431 may be formed in one area of the heat generating member, and the second heat generating portion 432 may be formed in another area of the heat generating member.

The heat generating portion 430 may be coupled to the lower surface of the main body 410 in the third direction C. Accordingly, as described above, the heat generating portion 430 may be disposed at the lower side of the cooking surface 420.

Heat generated by the heat generating portion 430 may be conducted to the lower side of the cooking surface 420 through the main body 410. Accordingly, the lower side of the cooking surface 420 may be supplied with heat of approximately the same temperature as the heat generated by the heat generating portion 430.

As described above, the heat generating portion 430 may be formed of a ferrite material. The content of the ferrite material of the first heat generating portion 431 and the content of the ferrite material of the second heat generating portion 432 may be provided different from each other.

That is, the heat generating portion 430 is provided to contain a ferrite material as a whole, and the content of the ferrite material in the first heat generating portion 431 and the content of the ferrite material in the second heat generating portion 432 may be formed different from each other.

According to the embodiment of the disclosure, the content of the ferrite material of the first heat generating portion 431 may be provided to be greater than the content of the ferrite material of the second heat generating portion 432.

The ferrite material may absorb high frequency waves generated by the magnetron 310 and generate heat. The first heat generating portion 431 containing more ferrite material may generate heat of a temperature higher than that of the second heat generating portion 432.

Accordingly, the first heat generating portion 431 may generate heat of a temperature higher than that of the second heat generating portion 432.

Therefore, cooking objects having different cooking temperatures may be cooked through the cooking appliance 1 at the same time. When a cooking object with a relatively high appropriate cooking temperature and a cooking object with a relatively low appropriate cooking temperature are placed in the first area 421 and the second area 422, respectively, and cooked at the same time, each cooking object may be cooked at a respective appropriate cooking temperature.

The first heat generating portion 431 may be disposed at a position corresponding to the first heater 210 in the third direction C. The second heat generating portion 432 may be disposed at a position corresponding to the second heater 220 in the third direction C.

The upper side of the first area 421 may be supplied with heat by the first and third heaters 210 and 230, and the lower side of the first area 421 may be supplied with heat by the first heat generating portion 431.

The upper side of the second area 422 may be supplied with heat by the second and fourth heaters 220 and 240, and the lower side of the second area 422 may be supplied with heat by the second heat generating portion 432.

The temperature T1 of heat supplied from the first and third heaters 210 and 230 and the temperature T1 of heat generated by the first heat generating portion 431 may be approximately the same. Accordingly, the cooking object positioned in the first area 421 may be provided with approximately the same temperature T1 in the vertical direction with respect to the third direction C.

The temperature T2 of heat supplied from the second and fourth heaters 220 and 240 and the temperature T2 of heat generated by the second heat generating portion 432 may be approximately the same. Accordingly, the cooking object positioned in the second area 422 may be provided with approximately the same temperature T2 in the vertical direction with respect to the third direction C.

The temperature T1 of heat supplied from the first and third heaters 210 and 230 and the temperature T1 of heat generated from the first heat generating portion 431, and the temperature T2 of heat supplied from the second and fourth heaters 220 and 240 and the temperature T2 of heat generated by the second heat generating portion 432 may be individually controlled by a control unit.

The appropriate cooking temperature may be different depending on the type of the cooking object, and the temperature T1 of heat supplied from the first and third heaters 210 and 230 and the temperature T1 of heat generated by the first heat generating portion 431 may be adjusted by the control unit so as to correspond to the appropriate cooking temperature of the cooking object positioned on the first area 421.

In addition, the temperature T2 of heat supplied from the second and fourth heaters 220 and 240 and the temperature T2 of heat generated by the second heat generating portion 432 may be adjusted by the control unit so as to correspond to the appropriate cooking temperature of the cooking object positioned on the second area 422.

As such, the heat generating portion 430 may include the first heat generating portion 431 and the second heat generating portion 432 capable of generating heat at different temperatures T1 and T2, and each provide one of the first area 421 and the second area 422 corresponding thereto with heat of a different temperature.

Accordingly, cooking objects having different cooking temperatures may be cooked in the first and second areas 421 and 422 simultaneously through the cooking appliance 1.

In addition, as described above, the plurality of heaters 210, 220, 230, and 240 may also provide heat of different temperatures to the first and second areas 421 and 422, similar to the heat generating portion 430.

In the first area 421, the temperature of heat provided in the vertical direction by the first heating source 200 and the temperature of heat provided in the vertical direction by the heat generating portion 430 may be provided approximately similar, and in the second area 422, the temperature of heat provided in the vertical direction by the first heating source 200 and the temperature of heat provided in the vertical direction by the heat generating portion 430 may be provided approximately similar.

The first area 421 may be supplied with approximately the same temperature uniform in the vertical direction. The second area 422 may be supplied with a temperature different from the temperature supplied to the first area 421 and uniform in the vertical direction.

According to the plurality of heaters 210, 220, 230, and 240 providing heat of different temperatures to the respective areas 421 and 422, and the heat generating portion 430 including the first heat generating portion 431 and the second heat generating portion 432 providing heat of different temperatures to the respective areas 421 and 422, cooking objects having different cooking temperatures are placed in the first area 421 and the second area 422, respectively, to be supplied with different temperatures of heat, and are stably cooked at the same time.

The short side 420S of the cooking surface 420 may extend in a direction perpendicular to the long side 420L and corresponding to the first direction A. In this case, when the direction in which the first area 421 and the second area 422 are divided is provided in the first direction A based on the plurality of heaters 210, 220, 230, and 240 and also the first and second heat generating portions 431 and 432, the first area 421 and the second area 422 may not have enough lengths in one direction. That is, when the first and second areas 421 and 422 are divided in the direction along the short side 420S, the first and second areas 421 and 422 are caused to have lengths that are short in the first direction A.

However, according to the embodiment of the disclosure, the plurality of heaters 210, 220, 230, and 240 of the cooking appliance 1 are disposed to be spaced apart from each other in the second direction B, and the first and second heat generating portions 431 and 432 are arranged in the second direction B, and the first area 421 and the second area 422 are divided in the second direction B. Because the long side 420L of the cooking surface 420 extends in the second direction B, the first area 421 and the second area 422 have sufficient lengths in one direction.

That is, assuming that the length of the first area 421 in the second direction B is a first length 421*a* and the length of the second area 422 in the second direction B is a second length 422*a*, the first length 421*a* and the second length 422*a* may be provided in a length approximately large enough to have the entire cooking object within the first area 421 or the second area 422.

Accordingly, the first area 421 and the second area 422 on which different cooking objects may be placed may have a size of 421*a**420S and a size of 422*a**420S, respectively. The first length 421*a* or the second length 422*a* may have a length substantially corresponding to the short side 420S of the cooking surface 420. Accordingly, the cross-sectional area of the first area 421 and the second area 422 may be provided in an approximately square shape, and the cooking object may be easily located within the first area 421 or the second area 422.

The first length 421*a* or the second length 422*a* is not limited thereto, and the first length 421*a* or the second length 422*a* may be formed to have a length different from the length of the short side 420S of the cooking surface 420, and the cross sectional area of the first area 421 and the second area 422 may have a rectangular shape.

However, the ratio of the short side 420S of the cooking surface 420 to the first length 421*a* or the second length 422*a* (421*a*/420S, 422*a*/420S) may be provided to be larger than the ratio of the long side 420L of the cooking surface 420 to a first length or a second length obtained when the first area 421 and the second area 422 are divided in the first direction A.

That is, as the first area 421 and the second area 422 are divided in the direction along the long side 420L of the cooking surface 420, that is, the second direction B, the area of the cooking surface 420 may be efficiently divided. This is because the heat generating portion 430 including the first heat generating portion 431 and the second heat generating portion 432 capable of generating heat of different temperatures are disposed on the lower side of the shelf 400.

Hereinafter, a cooking appliance 1 according to another embodiment of the disclosure will be described. Components except for a heat generating portion 430' of the cooking appliance 1 described below are the same as those of the cooking appliance 1 according to the above embodiment, and thus detailed descriptions thereof will be omitted.

Figure 6:
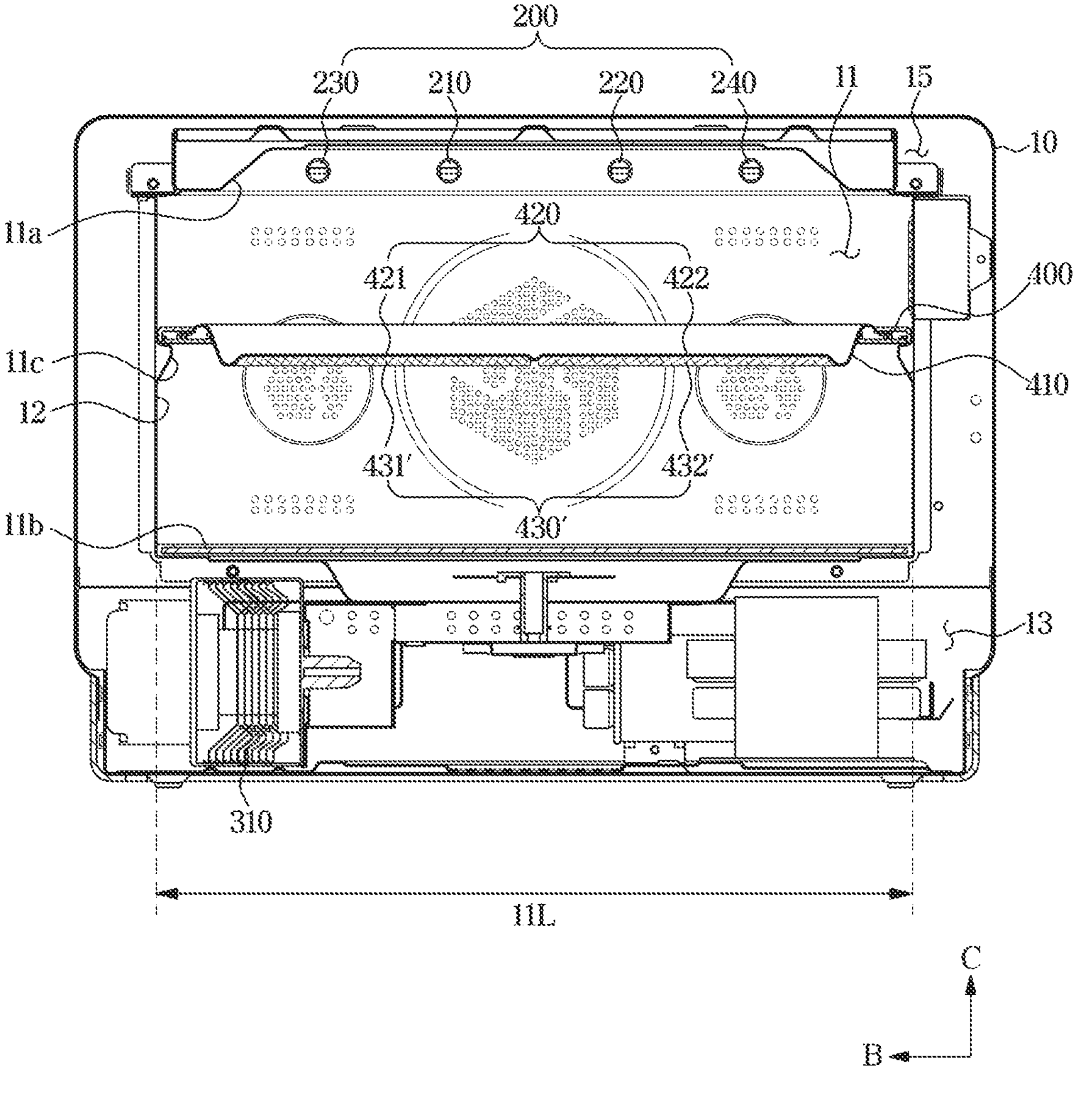
FIG. 6 is a cross-sectional view illustrating a cooking appliance according to another embodiment of the disclosure.
Figure 7:
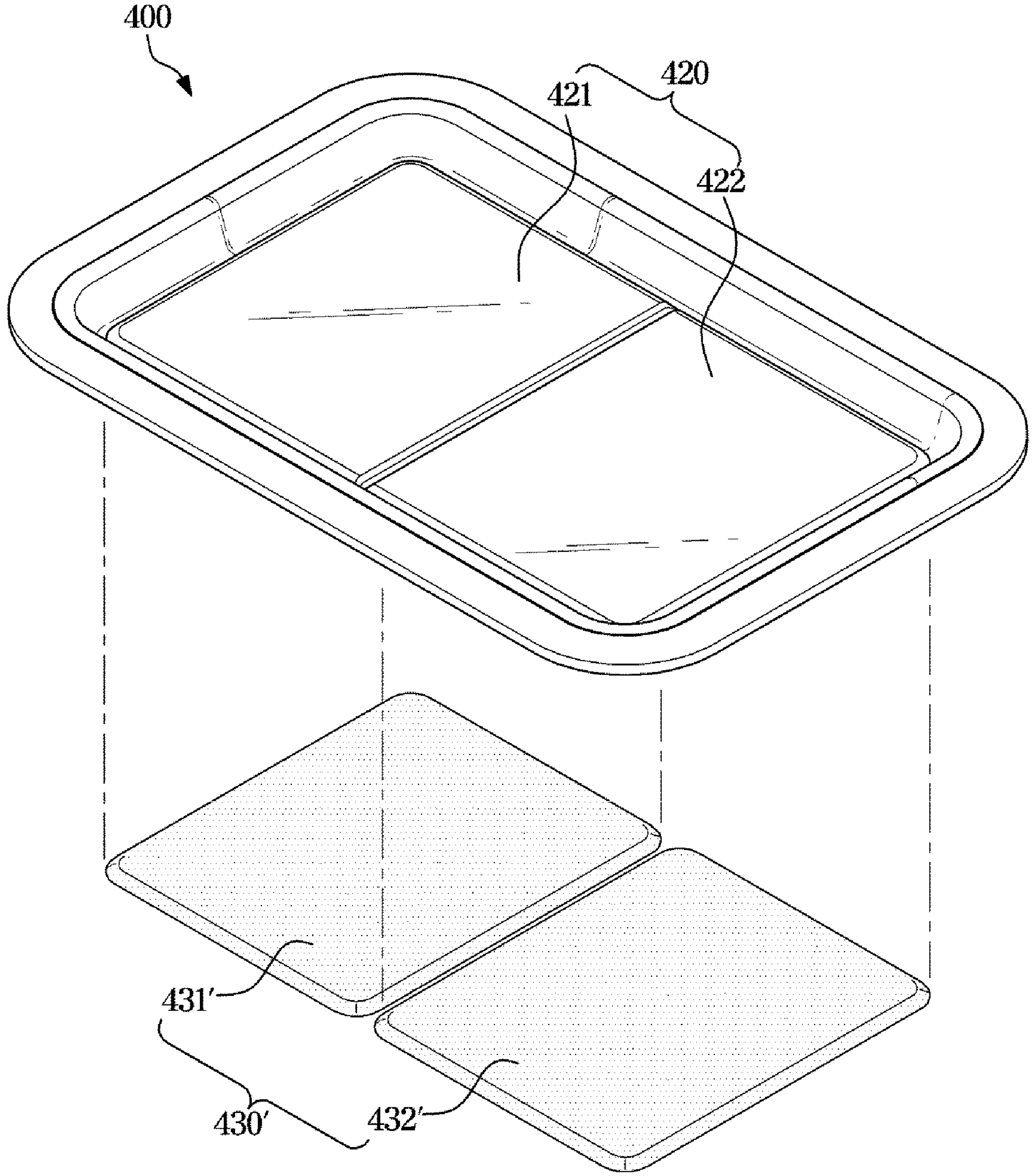
FIG. 7 is an exploded perspective view illustrating a shelf according to the embodiment of the disclosure.

FIG. 6 is a cross-sectional view illustrating a cooking appliance 1 according to the embodiment of the disclosure, and FIG. 7 is an exploded perspective view illustrating a shelf according to the embodiment of the disclosure.

Referring to FIGS. 6 and 7, the heat generating portion 430' may include a first heat generating portion 431 'and a second heat generating portion 432' provided as separate components.

The heat generating portion 430 according to the above described embodiment of the disclosure is formed of a single heat generating member, and the first heat generating portion 431 is partitioned as one heat generating area of the heat generating member, and the second heat generating portion 432 is partitioned as another heat generating area, while the heat generating portion 430' according to the embodiment of the disclosure may be provided as separate heat generating members.

The first heat generating portion 431' may be disposed at a position corresponding to the first area 421 in the third direction C. The second heat generating portion 432' may be disposed at a position corresponding to the second area 422 in the third direction C.

The first heat generating portion 431' and the second heat generating portion 432' may be arranged side by side in the second direction B.

Each of the first heat generating portion 431' and the second heat generating portion 432' may be heated by high frequency waves oscillated by the magnetron 310 and thus generate heat.

The first heat generating portion 431' and the second heat generating portion 432' may include a ferrite material.

The content of the ferrite material of the first heat generating portion 431' and the content of the ferrite material of the second heat generating portion 432' may be formed different from each other. Accordingly, the first heat generating portion 431' and the second heat generating portion 432' may each be provided to generate heat that reaches a different temperature.

In addition, the first heat generating portion 431' and the second heat generating portion 432' may each be provided to include a different material. Accordingly, even when the same high frequency waves are generated by the magnetron 310, the temperature of heat generated by the first heat generating portion 431' may be different the temperature of heat generate by the second heat generating portion 432'.

That is, at least one of the first heat generating portion 431' and the second heat generating portion 432' may be formed of a material other than ferrite that generates heat by high frequency waves. The material may be a material capable of generating heat of a temperature different from that of heat generated from ferrite by absorbing the same high frequency waves as those absorbed by ferrite.

In addition, the first heat generating portion 431' and the second heat generating portion 432' may each be formed of a ferrite mixture including a different material. Accordingly, even when the same high frequency waves are absorbed by the first heat generating portion 431' and the second heat generating portion 432', the temperature of heat generated by the first heat generating portion 431' may be different from the temperature of heat generated by the second heat generating portion 432' due to the difference in materials forming the first heat generating portion 431' and the second heat generating portion 432'.

Hereinafter, a cooking appliance 1 according to another embodiment of the disclosure will be described. Components except for a shelf 500 and a first heating source 200 of the cooking appliance 1 described below are the same as those of the cooking appliance 1 according to the above embodiment, and thus detailed descriptions thereof will be omitted.

Figure 8:
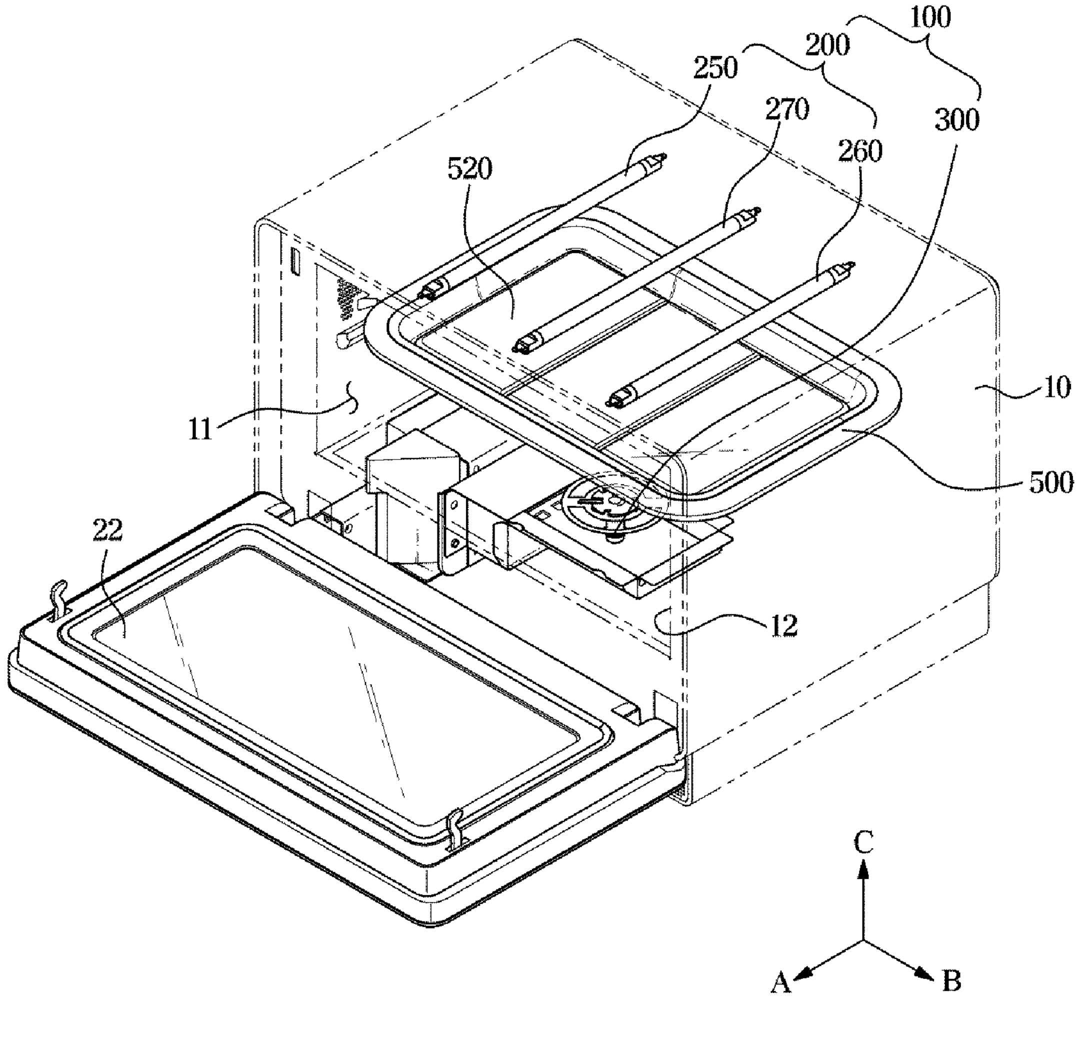
FIG. 8 is a view illustrating some components of a cooking appliance according to another embodiment of the disclosure.
Figure 9:
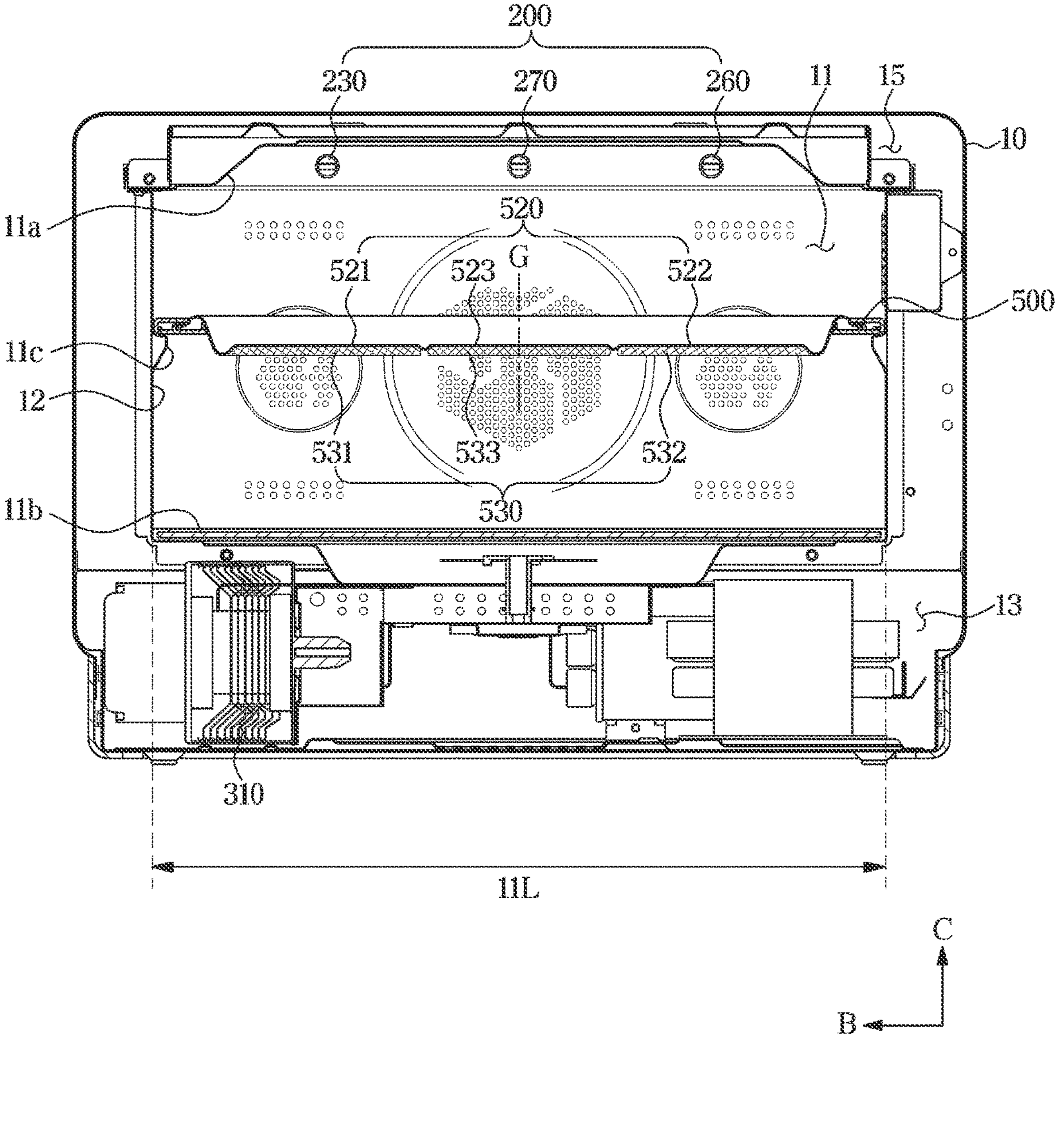
FIG. 9 is a cross-sectional view illustrating the cooking appliance according to the embodiment of the disclosure.

FIG. 8 is a diagram illustrating internal components of the cooking appliance according to the embodiment of the disclosure, and FIG. 9 is a cross-sectional view illustrating the cooking appliance according to the embodiment of the disclosure.

Referring to FIGS. 8 and 9, the first heat source 200 may include three heaters 250, 260, and 270. The three heaters 250, 260, and 270 may be spaced apart from each other in the second direction B. Although the three heaters 250, 260, and 270 are described, the number of heaters is not limited thereto. For example, each of the three heaters 250, 260, and 270 may be provided in a pair, forming six heaters in total.

The first heater 250 may be disposed on one side with respect to a center line G of the shelf 500 in the second direction B. The second heater 260 may be disposed on the opposite side with respect to the center line G. The third heater 270 may be disposed adjacent to the center line G.

The first heater 250, the second heater 260, and the third heater 270 may each generate heat of a different temperature. That is, the temperature of heat generated from one side with respect to the center line G, the temperature of heat generated from the opposite side, and the temperature of heat generated from the center line G may be provided different from each other.

The shelf 500 may include a first area 521, a second area 522, and a third area 523 formed on a cooking surface 520. The first area 521, the second area 522, and the third area 523 may be divided based on the second direction B.

In detail, the first area 521 may be formed on one side with respect to the center line G, the third area 523 may be formed on the center line G, and the second area 522 may be formed on the opposite side with respect to the center line G.

The first area 521 may be disposed at a position corresponding to the first heater 250 in the third direction C. The second area 522 may be disposed at a position corresponding to the second heater 260. The third area 523 may be disposed at a position corresponding to the third heater 270 in the third direction C.

As described above, since the temperature of heat generated from the first heater 250, the temperature of heat generated from the second heater 260, and the temperature of heat generated from the third heater 270 are different from each other, the temperature of heat transferred to an upper side of the first area 521, the temperature of heat transferred to an upper side of the second area 522, and the temperature of heat transferred to an upper side of the third area 523 are different from each other.

A heat generating portion 530 may be disposed at a lower side of the cooking surface 520 in the third direction C. The heat generating portion 530 may generate heat by absorbing the high frequency waves oscillated from the magnetron 310.

The heat generating portion 530 may include a first heat generating portion 531, a second heat generating portion 532, and a third heat generating portion 533 that generate heat of different temperatures by absorbing high frequency waves.

Each of the first, second and third heat generating portions 531, 532, and 533 may be provided to have a different ferrite content. Accordingly, even when the same high frequency waves are oscillated, each of the first, second and third heat generating portions 531, 532, and 533 may generate heat of a different temperature.

The first heat generating portion 531 may be disposed at a position corresponding to the first area 521 in the third direction C. The second heat generating portion 532 may be disposed at a position corresponding to the second area 522 in the third direction C. The third heat generating portion 533 may be disposed at a position corresponding to the third area 523 in the third direction C.

Accordingly, the temperature of heat transferred to the lower side of the first area 521, the temperature of heat transferred to the lower side of the second area 522, and the temperature of heat transferred to the lower side of the third area 523 may be different from each other.

The temperature of heat generated by the third heater 250 and the temperature of heat generated by the first heat generating portion 531 may be provided approximately the same. The temperature of heat generated by the second heater 260 and the temperature of heat generated by the second heat generating portion 532 may be provided approximately the same. The temperature of heat generated by the third heater 270 and the temperature of heat generated by the third heat generating portion 533 may be provided approximately the same.

Accordingly, the first area 521 may be supplied with approximately the same temperature along the vertical direction, the second area 522 may be supplied with approximately the same temperature along the vertical direction, and the third area 523 may be supplied with approximately the same temperature along the vertical direction.

Accordingly, in the cooking apparatus 1 according to the embodiment of the disclosure, three cooking objects having different cooking temperatures may be simultaneously cooked in the cooking chamber 11.

Hereinafter, a cooking appliance 1 according to another embodiment of the disclosure will be described. Components except for a shelf 600 and a first heating source 200 of the cooking appliance 1 described below are the same as those of the cooking appliance 1 according to the above embodiment, and thus detailed descriptions thereof will be omitted.

Figure 10:
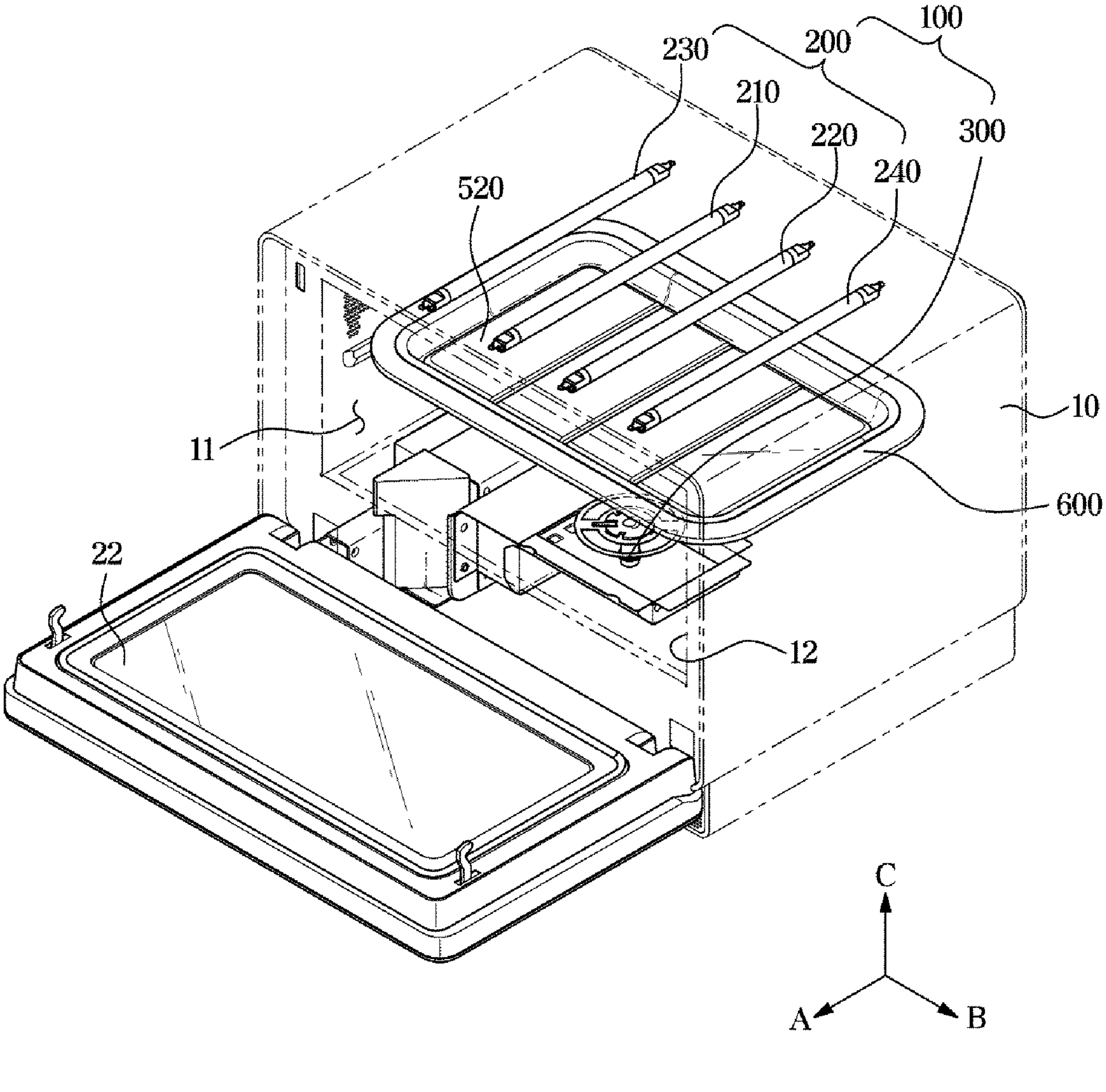
FIG. 10 is a view illustrating some components of a cooking appliance according to another embodiment of the disclosure.
Figure 11:
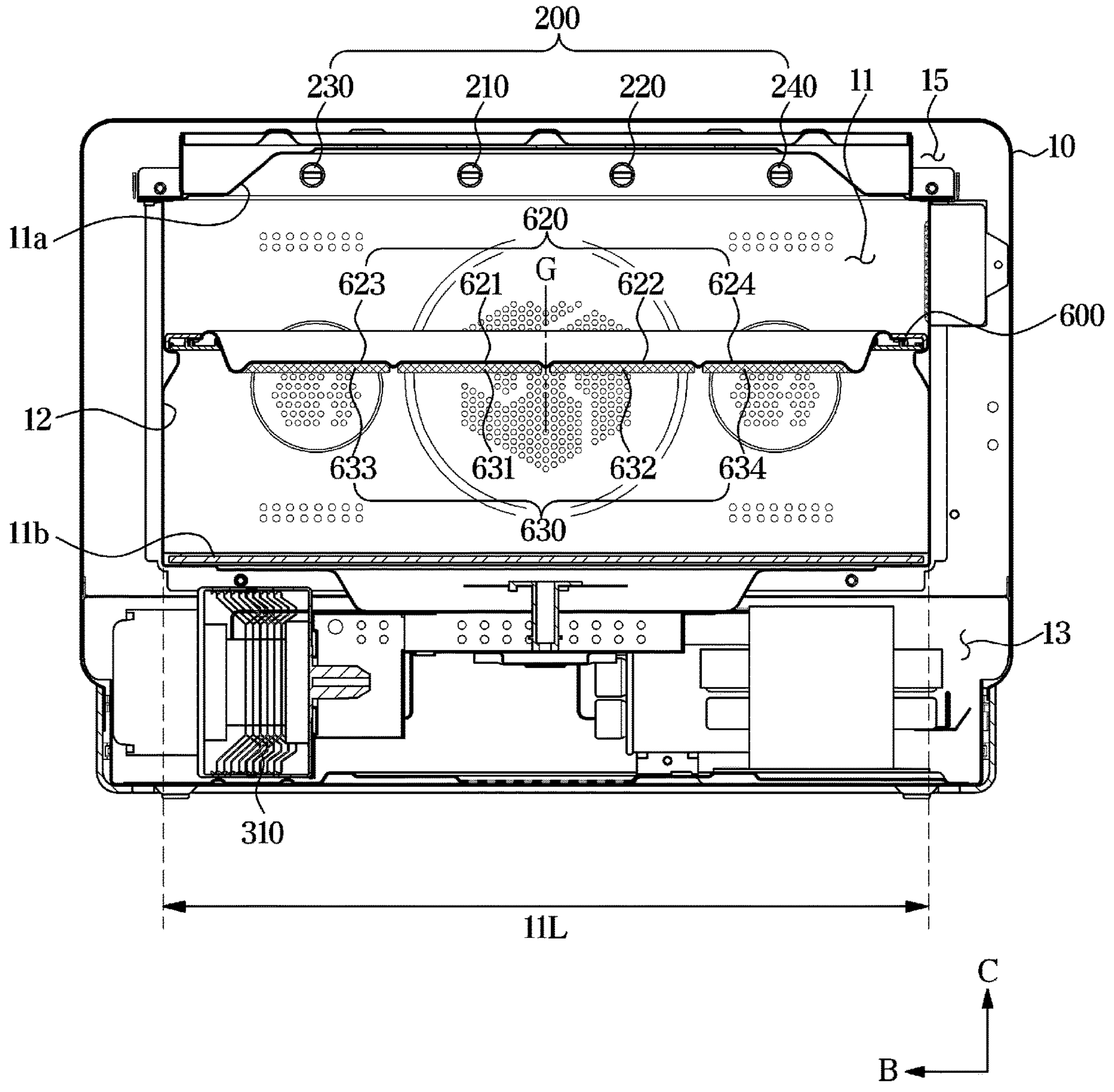
FIG. 11 is a cross-sectional view illustrating the cooking appliance according to the embodiment of the disclosure.

FIG. 10 is a diagram illustrating internal components of the cooking appliance according to the embodiment of the disclosure, and FIG. 11 is a cross-sectional view illustrating the cooking appliance according to the embodiment of the disclosure;

Referring to FIGS. 10 and 11, the first heat source 200 may include four heaters 210, 220, 230, and 240. The four heaters 210, 220, 230, and 240 may be spaced apart from each other in the second direction B. Although the four heaters 210, 220, 230, and 240 are described, the number of heaters is not limited thereto. For example, each of the four heaters 210, 220, 230, and 240 may be provided in a pair, forming eight heaters in total.

Unlike the plurality of heaters 210, 220, 230, and 240 according to the above-described embodiment of the disclosure, the four heaters 210, 220, 230, and 240 may each generate heat of a different temperature.

The first heater 210 may be disposed on one side with respect to a center line G of the shelf 600 in the second direction B. The second heater 220 may be disposed on the opposite side with respect to the center line G. The third heater 230 may be disposed on the one side with respect to the center line G together with the first heater 210. The fourth heater 240 may be disposed on the other side with respect to the center line G together with the second heater 220.

As described above, the first heater 210, the second heater 220, the third heater 230, and the fourth heater 240 may generate heat of different temperatures. That is, the plurality of heaters 210, 220, 230, and 240 may generate heat of different temperatures in the third direction C in which heat is transferred.

The shelf 600 may include a first area 621, a second area 622, a third area 623, and a fourth area 624 formed on a cooking surface 620. The first area 621, the second area 622, the third area 623, and the fourth area 624 may be divided based on the second direction B.

In detail, the first area 621 and the third area 623 may be formed on one side with respect to the center line G, and the second area 622 and the fourth area 624 may be formed on the opposite side with respect to the center line G.

The first area 621 and the third area 623 are separately divided on the one side with respect to the center line G, and the second area 622 and the fourth area 624 are separately divided on the opposite side with respect to the center line G.

The first area 621 may be disposed at a position corresponding to the first heater 210 in the third direction C. The second area 622 may be disposed at a position corresponding to the second heater 220 in the third direction C. The third area 623 may be disposed at a position corresponding to the third heater 230 in the third direction C. The fourth area 624 may be disposed at a position corresponding to the fourth heater 240 in the third direction C.

As described above, since the temperature of heat generated from the first heater 210, the temperature of heat generated from the second heater 220, the temperature of heat generated from the third heater 230, and the temperature of heat generated from the fourth heater 240 are different from each other, the temperature of heat transferred to an upper side of the first area 621, the temperature of heat transferred to an upper side of the second area 622, the temperature of heat transferred to an upper side of the third area 623, and the temperature of heat transferred to an upper side of the fourth area 624 are different from each other.

A heat generating portion 630 may be disposed at a lower side of the cooking surface 620 in the third direction C. The heat generating portion 630 may generate heat by absorbing the high frequency waves oscillated from the magnetron 310.

The heat generating portion 630 may include a first heat generating portion 631, a second heat generating portion 632, a third heat generating portion 633, and a fourth heat generating portion 635 that generate heat of different temperatures by absorbing high frequency waves.

Each of the first, second, third, and fourth heat generating portions 631, 632, 633, and 634 may be provided to have a different content of ferrite. Accordingly, even when the same high frequency waves are oscillated, each of the first, second, third, and fourth heat generating portions 631, 632, 633, and 634 may generate heat of a different temperature.

The first heat generating portion 631 may be disposed at a position corresponding to the first area 621 in the third direction C. The second heat generating portion 632 may be disposed at a position corresponding to the second area 622 in the third direction C. The third heat generating portion 633 may be disposed at a position corresponding to the third area 623 in the third direction C. The fourth heat generating portion 634 may be disposed at a position corresponding to the fourth area 624 in the third direction C.

Accordingly, the temperature of heat transferred to the lower side of the first area 621, the temperature of heat transferred to the lower side of the second area 622, the temperature of heat transferred to the lower side of the third area 623, and the temperature of heat transferred to the lower side of the fourth area 624 may be different from each other.

The temperature of heat generated by the third heater 210 and the temperature of heat generated by the first heat generating portion 631 may be provided approximately the same. The temperature of heat generated by the second heater 220 and the temperature of heat generated by the second heat generating portion 632 may be provided to be approximately the same. The temperature of heat generated by the third heater 230 and the temperature of heat generated by the third heat generating portion 633 may be provided approximately the same. The temperature of heat generated by the fourth heater 240 and the temperature of heat generated by the fourth heat generating portion 634 may be provided approximately the same.

Accordingly, the first area 621 may be supplied with approximately the same temperature along the vertical direction, the second area 622 may be supplied with approximately the same temperature along the vertical direction, the third area 623 may be supplied with approximately the same temperature along the vertical direction, and the fourth area 624 may be supplied with approximately the same temperature along the vertical direction.

Accordingly, in the cooking apparatus 1 according to the embodiment of the disclosure, four cooking objects having different cooking temperatures may be simultaneously cooked in the cooking chamber 11.

Hereinafter, a cooking appliance 1 according to another embodiment of the disclosure will be described. Components except for a first heating source 200' of the cooking appliance 1 described below are the same as those of the cooking appliance 1 according to the above embodiment, and thus detailed descriptions thereof will be omitted.

Figure 12:
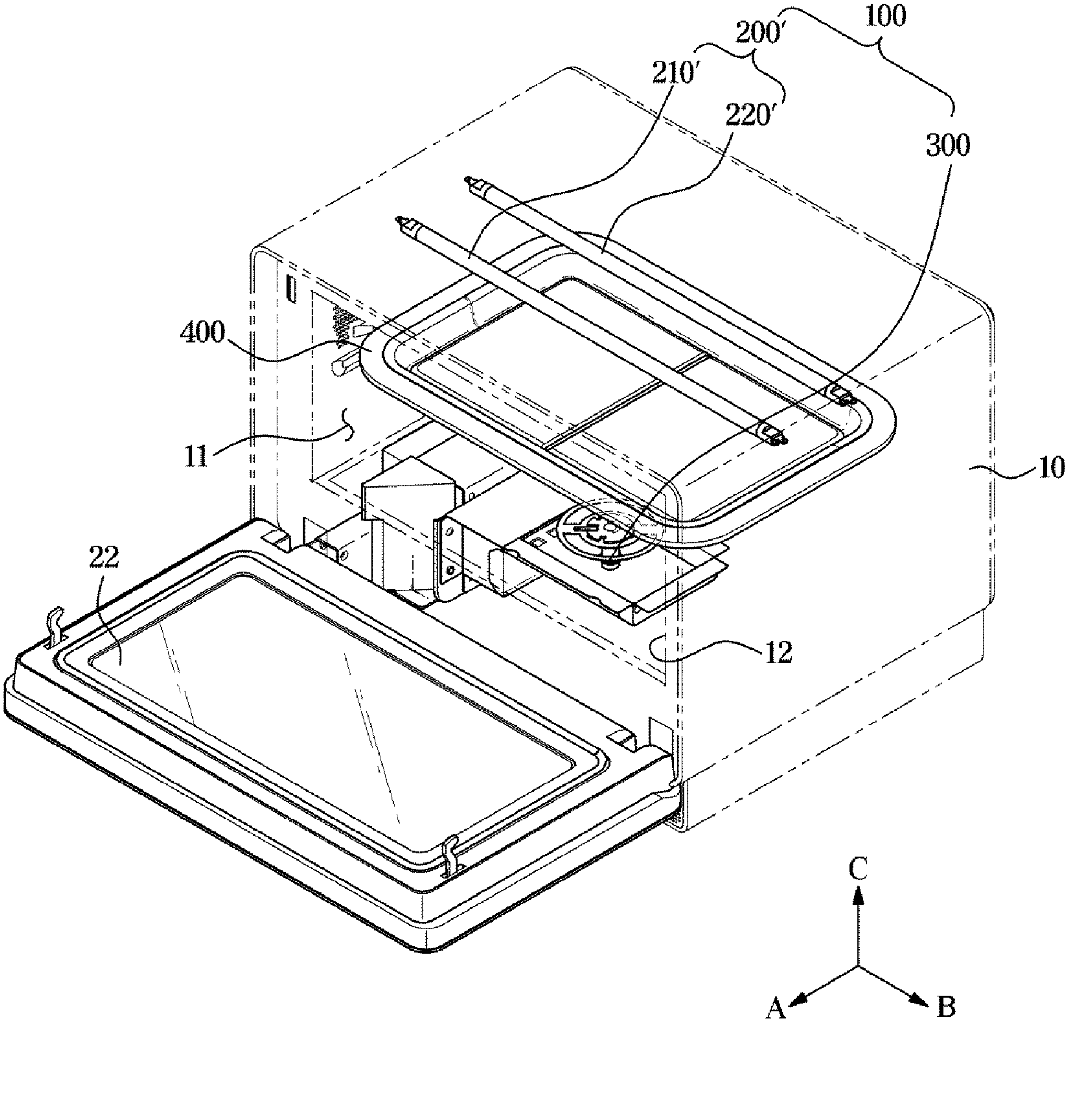
FIG. 12 is a view illustrating some components of a cooking appliance according to another embodiment of the disclosure.
Figure 13:
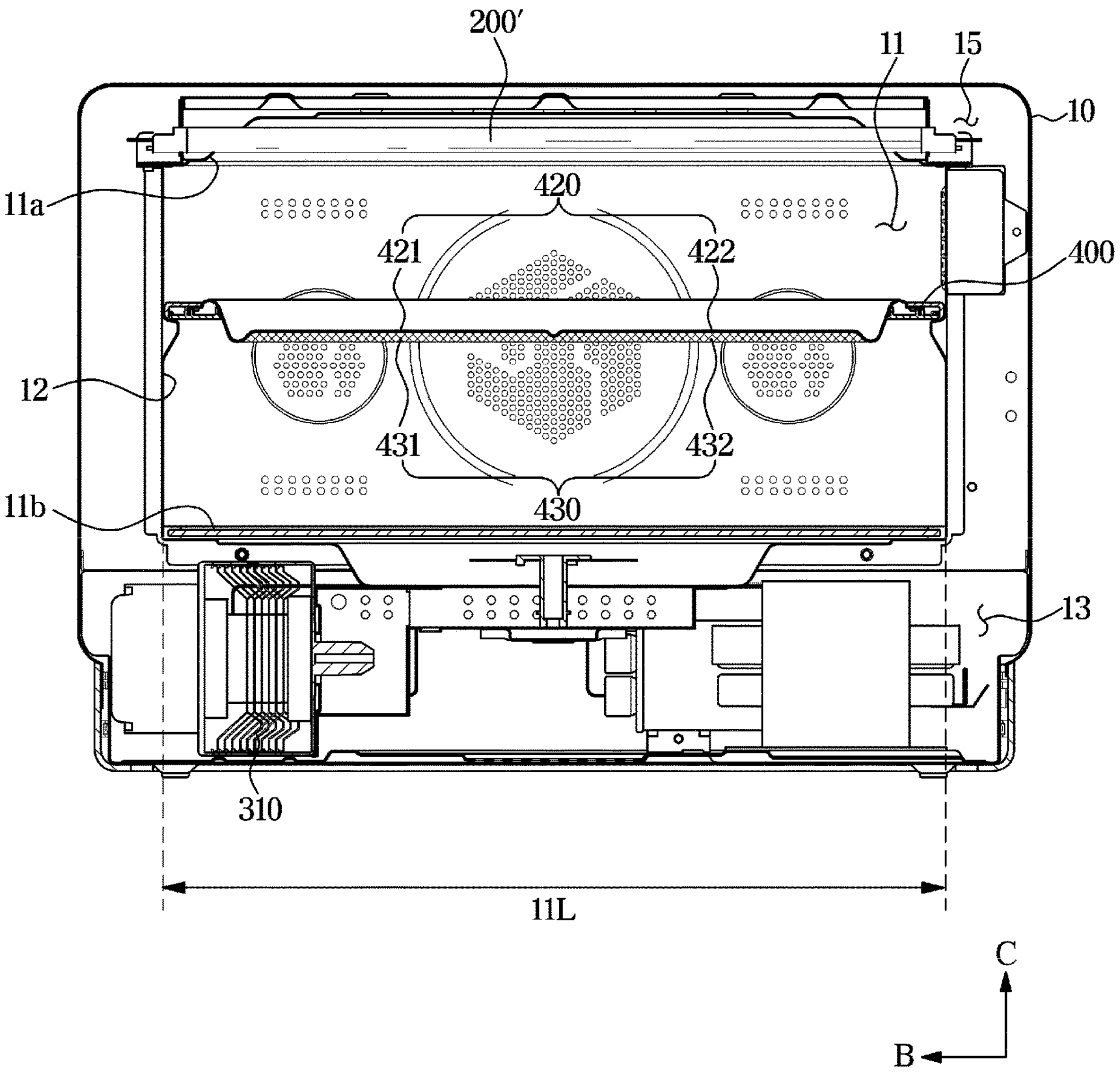
FIG. 13 is a cross-sectional view illustrating the cooking appliance according to the embodiment of the disclosure.

FIG. 12 is a diagram illustrating internal components of the cooking appliance according to the embodiment of the disclosure, and FIG. 13 is a cross-sectional view illustrating the cooking appliance according to the embodiment of the disclosure;

Unlike the first heating source 200 according to the above described embodiment of the disclosure, the first heating source 200' according to the embodiment of the disclosure may include a plurality of heaters 210' and 220' each having a long axis extending in a direction corresponding to the second direction B.

Since the plurality of heaters 210' and 220' extend along the second direction B, heat of the same temperature may be transferred to the first area 421 and the second area 422. In detail, heat of the same temperature may be transferred to an upper side of the first area 421 and an upper side of the second area 422.

A first heat generating portion 431 may be disposed at a lower side of the first area 421, and a second heat generating portion 432 may be disposed at a lower side of the second area 422. Accordingly, heat having a different temperature may be transferred to each of the lower side of the first area 421 and the lower side of the second area 422.

Accordingly, even when heat of the same temperature is transferred to each upper side of the first area 421 and the second region 422, since heat of a different temperature is transferred to each of the lower side of the first area 421 and the lower side of the second area 422, cooking objects having different cooking temperatures may be cooked in the first area 421 and the second area 422, respectively.

Hereinafter, a cooking appliance 1' according to another embodiment of the disclosure will be described. Components except for a heating source 100' of the cooking appliance 1' described below are the same as those of the cooking appliance 1 according to the above embodiment, and thus detailed descriptions thereof will be omitted.

Unlike the cooking appliance 1 according to the above-described one embodiment and the above-described other embodiment, the cooking appliance 1' according to the embodiment of the disclosure to be described below will be described in relation to a general microwave as an example.

Figure 14:
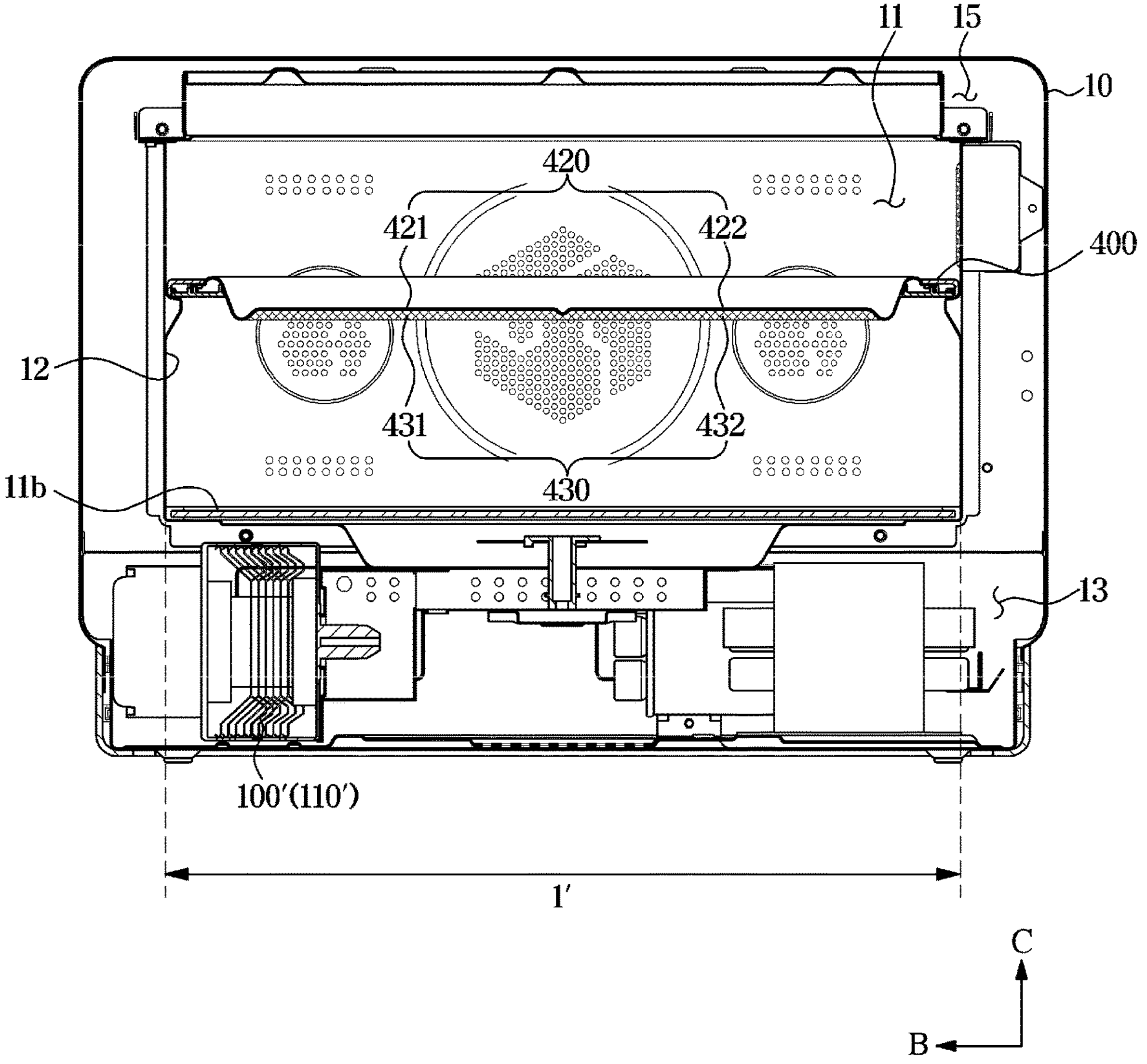
FIG. 14 is a cross-sectional view illustrating cooking appliance according to another embodiment of the disclosure.

FIG. 14 is a cross-sectional view illustrating the cooking appliance according to the embodiment of the disclosure;

The cooking appliance 1' may include a housing 10' forming the external appearance thereof and a cooking chamber 11 formed inside the housing 10'. A heating source 100' may be disposed on a lower surface 11*a* of the cooking chamber 11.

The heating source 100' may include a magnetron 110' that generates high frequency waves. The high frequency waves generated by the magnetron 110' may be scanned into a cooking object, by which the molecular arrangement of moisture contained in the cooking material is repeatedly changed to generate frictional heat between the molecules so that the inside of the cooking object is cooked.

The magnetron 110' may be disposed in a machine room 13. The magnetron 110' may oscillate high frequency waves from the machine room 13 toward the lower surface 11*b* of the cooking chamber 11, and the high frequency waves may pass through the lower surface 11*b* to be transmitted to the shelf 400.

The high frequency waves oscillated from the magnetron 110' may be absorbed by the heat generating portion 430, or reflected by the cooking chamber 11 or the shelf 400 to be directly introduced into the cooking object located on the cooking surface 420.

A first heat generating portion 431 may be disposed at a lower side of a first area 421, and a second heat generating portion 432 may be disposed at a lower side of a second area 422. Accordingly, heat having a different temperature may be transferred to each of the lower side of the first area 421 and the lower side of the second area 422.

Accordingly, even when the same high frequency waves are directly introduced into the first area 421 and the second area 422, heat of a different temperature is transferred to each of the lower side of the first area 421 and the lower side of the second area 422, so that cooking objects having different cooking temperatures may be cooked in the first area 421 and the second arear 422, respectively.

As is apparent from the above, the cooking appliance is provided with a plurality of heat generating portions provided on a shelf, on which a cooking object is placed, and due to the plurality of heat generating portions generating heat of different temperatures, a plurality of cooking spaces providing different temperatures are efficiently divided and arranged, so that two or more food items are easily disposed in the divided plurality of spaces, which enables two or more food items to be easily cooked at the same time through the cooking appliance Although few embodiments of the disclosure have been shown and described, the above embodiment is illustrative purpose only, and it would be appreciated by those skilled in the art that changes and modifications may be made in these embodiments without departing from the principles and scope of the disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A cooking appliance comprising:

a cooking chamber configured to cook food therein and openable in a first direction;

a shelf provided to be inserted into the cooking chamber in the first direction and having a cooking surface on which food is placed;

a heater disposed on an upper surface of the cooking chamber, the heater configured to supply radiant heat to the cooking surface; and a magnetron configured to generate high frequency waves to be supplied to the shelf through a lower surface of the cooking chamber, wherein:

the shelf includes a heat generating member configured to generate heat by the heat generating member absorbing the high frequency waves generated by the magnetron and disposed below the cooking surface so that the heat generated by the heat generating member is conducted to the cooking surface, the cooking surface includes a first area arranged at one side in a second direction perpendicular to the first direction with respect to a center line of the cooking chamber and a second area arranged at an opposite side in the second direction with respect to the center line of the cooking chamber, the heat generating member includes a ferrite material, a first heat generating portion disposed below the first area and having a rectangular shape to correspond to the first area and configured to supply heat to the first area, and a second heat generating portion disposed below the second area and having a rectangular shape to correspond to the second area, the first heat generating portion includes the ferrite material in a content larger than a content of the ferrite material included in the second heat generating portion, the first heat generating portion supplies more heat to the first area than the second heat generating portion supplies to the second area, the magnetron is disposed at a lower side of the cooking chamber in a third direction perpendicular to the first and second directions and faces the first heat generating portion and the second heat generating portion, the heater includes a first heater disposed above the first area to provide radiant heat to the first area and a second heater disposed above the second area to provide radiant heat to the second area, a temperature of heat provided to the first area by the first heater and the first heat generating portion is different from a temperature of heat provided to the second area by the second heater and the second heat generating portion, a temperature of heat supplied from the first heater is provided to be approximately equal to a temperature of heat emitted from the first heat generating portion, a temperature of heat supplied from the second heater is provided to be approximately equal to a temperature of heat emitted from the second heat generating portion, and the shelf further includes a depression formed between the first area and the second area along the center line so that the first area and the second area are divided.

2. The cooking appliance of claim 1, wherein the cooking surface of the shelf includes a long side extending in the second direction and a short side extending in the first direction.

3. The cooking appliance of claim 1, wherein:

the first heat generating portion is disposed to correspond to the first area in a third direction perpendicular to the first and second directions, and the second heat generating portion is disposed to correspond to the second area in the third direction.

4. The cooking appliance of claim 3, wherein the first heat generating portion is disposed at a side opposite to the second heat generating portion with respect to the cooking surface in the third direction.

5. The cooking appliance of claim 1, wherein the first heater and the second heater have a long axis extending in a direction corresponding to the first direction and are spaced apart from each other in the second direction.

6. The cooking appliance of claim 1, wherein the first heater and the second heater are each provided to supply a different temperature of heat to a corresponding one of the first and second areas.

7. The cooking appliance of claim 6, wherein the first heater is provided to supply the first area with an amount of heat that is greater than an amount of heat supplied to the second area by the second heater.

8. The cooking appliance of claim 1, wherein:

the cooking surface includes a third area arranged between the first area and the second area in the second direction, the heat generating member further includes a third heat generating portion provided to supply heat to the third area, and the third heat generating portion is disposed to correspond to the third area in a third direction perpendicular to the first and second directions.

9. The cooking appliance of claim 8, wherein the third heat generating portion is provided to supply the third area with heat having a temperature different from a temperature of heat supplied to the first area and the second area by the first and second heat generating portions, respectively.

10. A cooking appliance comprising:

a cooking chamber configured to cook food therein and openable in a first direction;

a heating source including a heater configured to supply radiant heat disposed on an upper surface of the cooking chamber and a magnetron disposed at another side of the cooking appliance, the magnetron configured to generate high frequency waves to be supplied through a lower surface of the cooking chamber; and a shelf provided to be inserted into the cooking chamber in the first direction and having a cooking surface on which food is placed, the cooking surface arranged to face the heater, wherein:

the shelf includes a heat generating member configured to generate heat by the heat generating member absorbing the high frequency waves generated by the magnetron and disposed below the cooking surface so that the heat generated by the heat generating member is conducted to the cooking surface, the cooking surface includes a first area arranged at one side in a second direction perpendicular to the first direction with respect to a center line of the cooking chamber and a second area arranged at an opposite side in the second direction with respect to the center line of the cooking chamber, the heat generating member includes a ferrite material, a first heat generating area at one side in a second direction perpendicular to the first direction and having a rectangular shape to correspond to the first area, and a second heat generating area arranged at another side in the second direction and having a rectangular shape to correspond to the second area, the first heat generating area includes the ferrite material in a content larger than a content of the ferrite material included in the second heat generating area, the first heat generating area and the second heat generating area are each provided to generate heat at a different temperature, and the magnetron is disposed at a lower side of the cooking chamber in a third direction perpendicular to the first and second directions and faces the first heat generating portion and the second heat generating portion, wherein the heater includes:

a first heater disposed above the first heat generating area to provide radiant heat to the first heat generating area, and a second heater disposed above the second heat generating area to provide radiant heat to the second heat generating area in a third direction, wherein a temperature of heat provided to a first area on the cooking surface by the first heater and the first heat generating area is different from a temperature of heat provided to a second area on the cooking surface by the second heater and the second heat generating area, a temperature of heat supplied from the first heater is provided to be approximately equal to a temperature of heat emitted from the first heat generating portion, and a temperature of heat supplied from the second heater is provided to be approximately equal to a temperature of heat emitted from the second heat generating portion, and wherein the shelf further includes a depression formed between the first area and the second area along the center line so that the first area and the second area are divided.

11. The cooking appliance of claim 10, wherein the first heater is provided to supply heat to a first area on the cooking surface corresponding to the first heat generating area in the third direction at a temperature different from a temperature of heat supplied to a second area on the cooking surface corresponding to the second heat generating area in the third direction.

12. A cooking appliance comprising:

a cooking chamber configured to cook food therein and openable in a first direction;

a shelf provided to be inserted into the cooking chamber in the first direction and having a long side extending in a second direction perpendicular to the first direction;

a heater disposed on an upper surface of the cooking chamber, the heater configured to supply radiant heat to a cooking surface;

a magnetron configured to generate high frequency waves to be supplied to the shelf through a lower surface of the cooking chamber; and a heat generating member configured to generate heat by the high frequency waves generated by the magnetron, wherein:

the cooking surface includes a first area arranged at one side in a second direction perpendicular to the first direction with respect to a center line of the cooking chamber and a second area arranged at an opposite side in the second direction with respect to the center line of the cooking chamber, the heat generating member includes a ferrite material, and includes a first heat generating portion disposed at one side in the second direction and having a rectangular shape to correspond to the first area, and a second heat generating portion disposed at another side in the second direction and having a rectangular shape to correspond to the second area, the first heat generating portion includes the ferrite material in a content larger than a content of the ferrite material included in the second heat generating portion, the magnetron is disposed at a lower side of the cooking chamber in a third direction perpendicular to the first and second directions and faces the first heat generating portion and the second heat generating portion, the heater includes a first heater disposed above the first heat generating portion to correspond to the first heat generating portion and a second heater disposed above the second heat generating portion to correspond to the second heat generating portion, a temperature of heat provided to a first area on the cooking surface by the first heater and the first heat generating portion is different from a temperature of heat provided to a second area on the cooking surface by the second heater and the second heat generating portion, a temperature of heat supplied from the first heater is provided to be approximately equal to a temperature of heat emitted from the first heat generating portion, and a temperature of heat supplied from the second heater is provided to be approximately equal to a temperature of heat emitted from the second heat generating portion, and the shelf further includes a depression formed between the first area and the second area along the center line so that the first area and the second area are divided.

* * * * *